US012600302B2

(12) United States Patent
Varao et al.

(10) Patent No.: US 12,600,302 B2
(45) Date of Patent: Apr. 14, 2026

(54) MIXER LADDER ASSIST

(71) Applicant: LMI US, LLC, Rochester, MN (US)

(72) Inventors: Robert Varao, Oshkosh, WI (US);
Bryan Datema, Rochester, MN (US);
Clint Glunz, Rochester, MN (US)

(73) Assignee: LMI US, LLC, Rochester, MN (US)

( * ) Notice: Subject to any disclaimer, the term of this
patent is extended or adjusted under 35
U.S.C. 154(b) by 960 days.

(21) Appl. No.: 17/831,925

(22) Filed: Jun. 3, 2022

(65) Prior Publication Data

US 2022/0388450 A1 Dec. 8, 2022

Related U.S. Application Data

(60) Provisional application No. 63/197,140, filed on Jun.
4, 2021.

(51) Int. Cl.
B60R 3/02 (2006.01)
B28C 5/42 (2006.01)
B60P 3/16 (2006.01)

(52) U.S. Cl.
CPC .............. B60R 3/02 (2013.01); B28C 5/4203
(2013.01); B60P 3/16 (2013.01)

(58) Field of Classification Search
CPC ................................ B60R 3/02; B28C 5/4203
See application file for complete search history.

(56) References Cited

U.S. PATENT DOCUMENTS 10,427,761 B2 * 10/2019 Grovender ............ B63B 27/146
2003/0221908 A1 * 12/2003 Fix ............................ B60R 3/02
182/86

* cited by examiner

*Primary Examiner* — Elizabeth Insler
(74) *Attorney, Agent, or Firm* — Taft Stettinius &
Hollister LLP

(57) ABSTRACT

A concrete mixer vehicle includes a chassis, a cab, a mixer
drum assembly coupled to the chassis, a ladder assembly,
and an assist assembly. The chassis includes a front end and
a rear end. The ladder assembly includes an upper ladder
portion and a lower ladder portion. The upper ladder portion
is fixed in position relative to the chassis. The lower ladder
portion is pivotally coupled to the upper ladder portion and
selectively repositionable between (a) a stowed position in
which the lower ladder portion is disposed along the upper
ladder portion and (b) a lowered position in which the lower
ladder portion extends away from the upper ladder portion.
The assist assembly is coupled to the upper ladder portion
and the lower ladder portion. The assist assembly configured
to resist the rotation of the lower ladder portion as it
transitions from the stowed position to the lowered position.

19 Claims, 16 Drawing Sheets

MIXER LADDER ASSIST

CROSS-REFERENCE TO RELATED PATENT APPLICATION

This application claims the benefit of and priority to U.S. Provisional Patent Application No. 63/197,140, filed Jun. 4, 2021, the disclosure of which is incorporated herein by reference in its entirety.

BACKGROUND

The present invention relates generally to the field of concrete mixer vehicles. More specifically, the present invention relates to an assist mechanism for a mixer ladder of the concrete mixer vehicle.

Concrete mixer vehicles are configured to receive, mix, and transport wet concrete or a combination of ingredients that when mixed form wet concrete to a job site. Concrete mixer vehicles include a rotatable mixing drum that receives concrete poured from vehicles or from stationary facilities, such as concrete mixing plants, and mixes the concrete disposed therein. Concrete mixer vehicles may be front discharge concrete mixer vehicles or rear discharge concrete mixer vehicles, which dispense concrete from the front or rear thereof, respectively. Rear discharge concrete mixer vehicles generally feature a drum with an outlet positioned at an aft end and a cab enclosure positioned at a fore end of the concrete mixer truck. Front discharge concrete mixer vehicles include a drum with an outlet supported above the cab enclosure of the concrete mixer vehicle to discharge concrete through a chute extending forward the concrete mixer vehicle. Because front discharge concrete mixer vehicles discharge concrete at the fore end, they can be used to supply concrete to locations having limited access. Concrete mixer vehicles are typically driven by an onboard internal combustion engine.

SUMMARY

One embodiment of the invention relates to a concrete mixer vehicle. The concrete mixer vehicle includes a chassis, a cab, a mixer drum assembly coupled to the chassis, a ladder assembly, and an assist assembly. The chassis includes a front end and a rear end. The cab is coupled to the front end of the chassis. The ladder assembly includes an upper ladder portion and a lower ladder portion. The upper ladder portion is fixed in position relative to the chassis. The lower ladder portion is pivotally coupled to the upper ladder portion and selectively repositionable between (a) a stowed position in which the lower ladder portion is disposed along the upper ladder portion and (b) a lowered position in which the lower ladder portion extends away from the upper ladder portion. The assist assembly is coupled to the upper ladder portion and the lower ladder portion. The assist assembly configured to resist the rotation of the lower ladder portion as it transitions from the stowed position to the lowered position.

Another embodiment of the invention relates to a ladder assembly. The ladder assembly includes a first rail extending along the entire length of the ladder assembly, a second rail extending along the entire length of the ladder assembly, parallel to the first rail, a plurality of steps positioned between the first rail and the second rail, an upper ladder portion positioned proximate a platform, a lower ladder portion coupled to the upper ladder portion, a ladder coupler, and a ladder assist positioned between the upper ladder portion and the lower ladder portion. The ladder assist is coupled to the lower ladder portion and a fixed structure. The plurality of steps are configured to support an operator. The ladder coupler is coupled to both the upper ladder portion and the lower ladder portion. The ladder assist is configured to pivot the lower ladder portion between a lowered position and a stowed position. The ladder assist slows the lower ladder portion when pivoting into the lowered position.

Another embodiment of the invention relates to a concrete mixer vehicle. The concrete mixer vehicle includes a chassis having a front end and a rear end, a cab coupled to the front end of the chassis, a mixer drum assembly coupled to the chassis, and a ladder assembly having an upper ladder portion and a lower ladder portion. The ladder assembly includes a first rail extending along the entire length of the ladder assembly, a second rail extending along the entire length of the ladder assembly and positioned parallel to the first rail, and a ladder assist positioned between the upper ladder portion and the lower ladder portion. The ladder assist is positioned between the upper ladder portion and the lower ladder portion is coupled to the lower ladder portion and a fixed structure. The ladder assist includes a soft close mechanism fixedly coupled to the lower ladder portion. The soft close mechanism further comprises an outer portion and an inner portion. The inner portion is slidably provided within the outer portion when the lower ladder portion is selectively repositioned between the stowed position and the lowered position.

This summary is illustrative only and is not intended to be in any way limiting. Other aspects, inventive features, and advantages of the devices or processes described herein will become apparent in the detailed description set forth herein, taking in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1A:
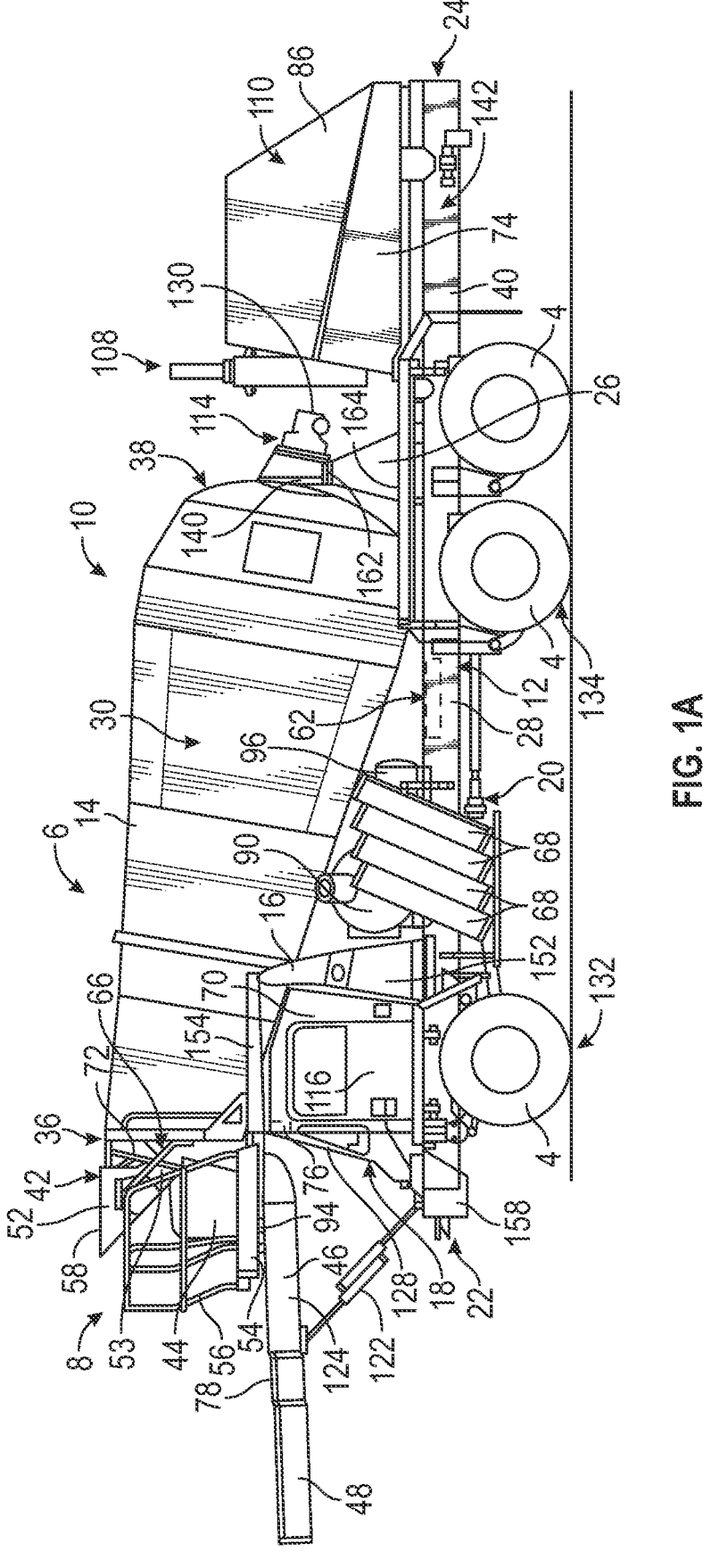
FIG. 1A is a side view of a concrete mixer truck, according to an exemplary embodiment.
Figure 1B:
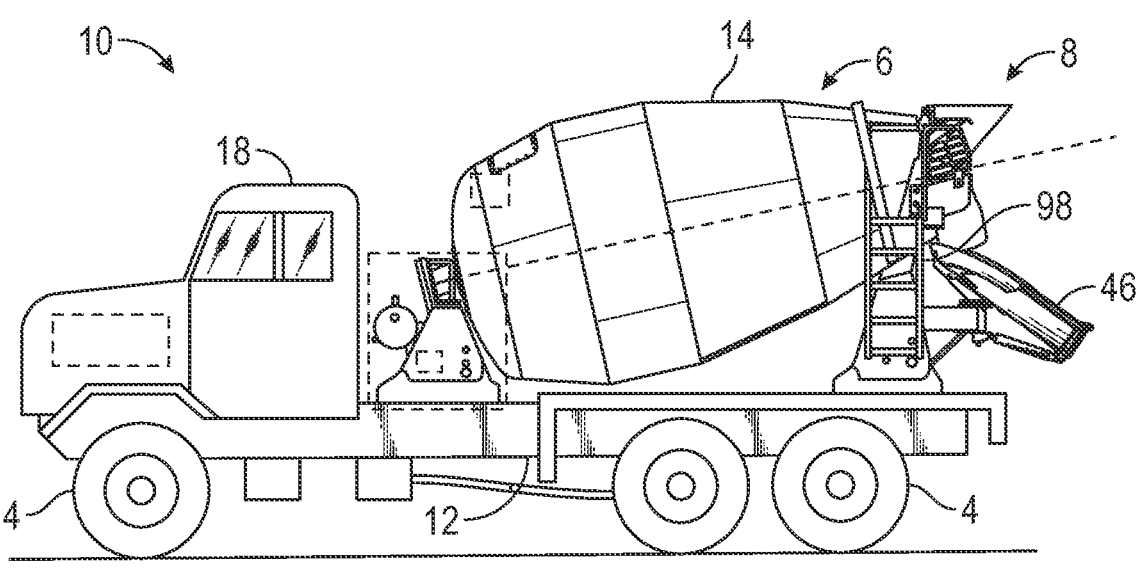
FIG. 1B is a side view of a concrete mixer truck, according to an exemplary embodiment.
Figure 1C:
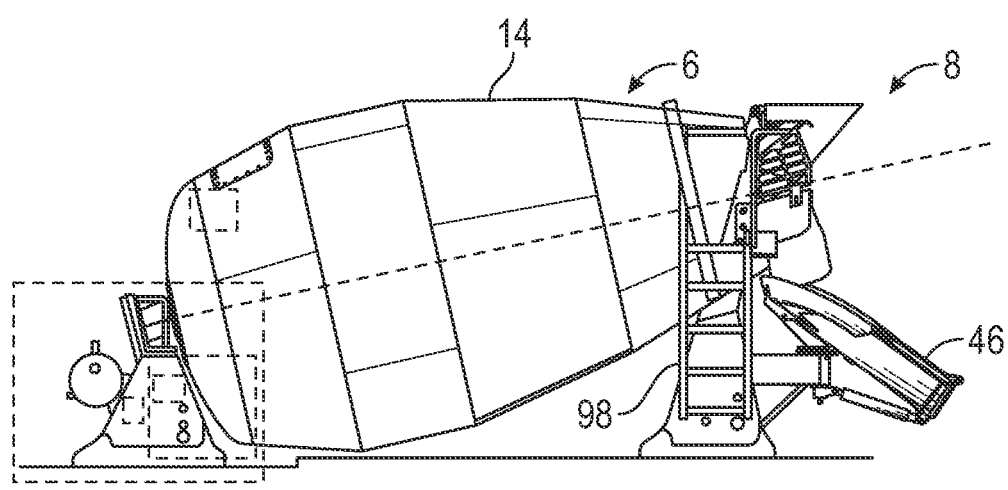
FIG. 1C is a side view of a drum assembly of a concrete mixer truck, according to an exemplary embodiment.
Figure 2:
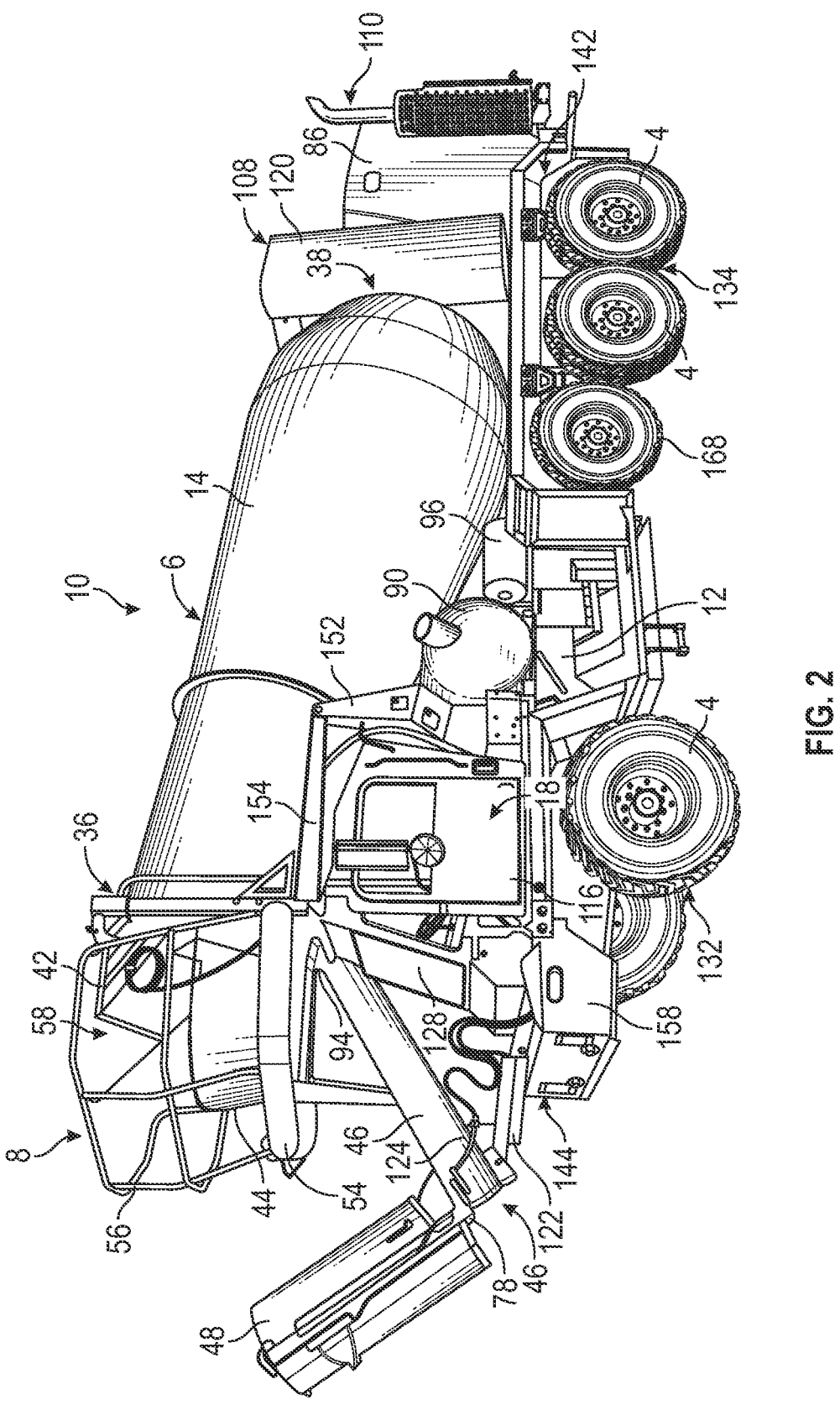
FIG. 2 is a front perspective view of the concrete mixer truck of FIG. 1A, according to an exemplary embodiment.
Figure 3:
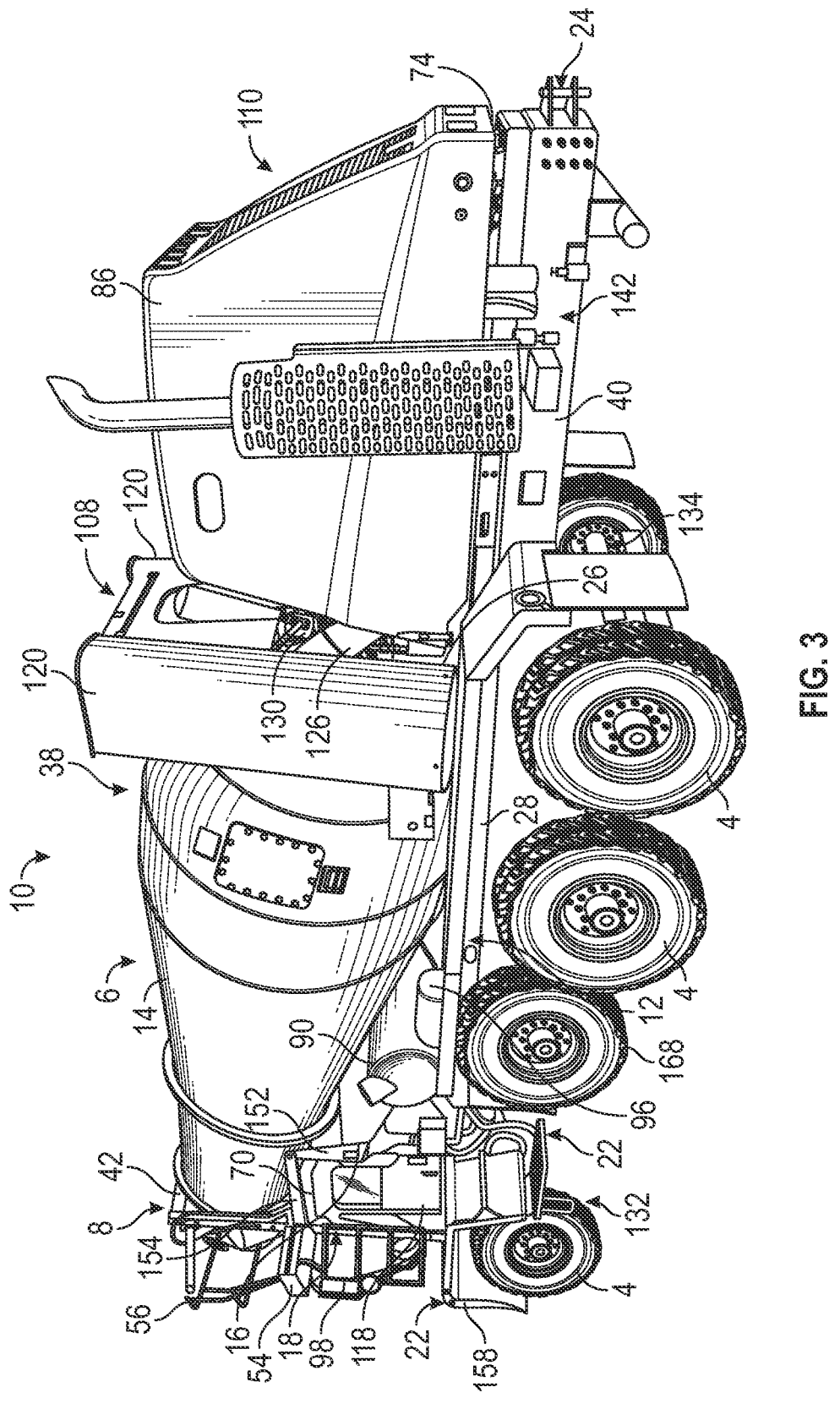
FIG. 3 is a rear perspective view of the concrete mixer truck of FIG. 1A, according to an exemplary embodiment.

According to the exemplary embodiment shown in FIGS. 1-3, a vehicle, shown as concrete mixer truck 10, is configured to transport concrete from a loading location (e.g., a batching plant, etc.) to a point of use (e.g., a worksite, a construction site, etc.). In some embodiments, as shown in FIGS. 1A and 2-3, the mixer vehicle 10 can be a front discharge concrete mixer vehicle. In other embodiments, as shown in FIGS. 1B-1C, the mixer vehicle 10 can be a rear discharge concrete mixer vehicle. The concrete mixer truck 10 includes a chassis 12, a drum assembly 6, a hopper assembly 8, a drive system 20, a fuel system 108, and an engine module 110. The concrete mixer truck 10 may include various additional engine, transmission, drive, electronic, tractive assembly, braking, steering and/or suspension systems, and hydraulic systems that are configured to support the various components of the concrete mixer truck 10. Generally, the chassis 12 supports a mixing drum 14 of the drum assembly 6, a front pedestal 16, a rear pedestal 26, a cab 18, and the engine module 110. Each of the chassis 12, the drum assembly 6, the hopper assembly 8, the drive system 20, the fuel system 108, and the engine module 110 are configured to facilitate receiving, mixing, transporting, and delivering concrete to a job site via the concrete mixer truck 10.

The chassis 12 includes a frame 28 that extends from a front end 22 to a rear end 24 of the concrete mixer truck 10. Wheels 4 are coupled to the frame 28 and moveably support the frame 28 above a ground surface or road. The wheels 4 may be replaced by other ground engaging motive members, such as tracks. In some embodiments, the chassis 12 includes hydraulic components (e.g., valves, filters, pipes, hoses, etc.) coupled thereto that facilitate operation and control of a hydraulic circuit including a drum drive pump and/or an accessory pump. The frame 28 provides a structural base for supporting the mixing drum 14, the front pedestal 16, the rear pedestal 26, the cab 18, and the engine module 110. In some embodiments, the frame 28 includes a widened front portion that extends over and about the wheels 4 positioned at the front end 22 of the chassis 12 to simultaneously support the cab 18 and serve as a fender for the wheels 4 positioned at the front end 22 of the chassis 12. The frame 28 may include lift eyes or other structures that facilitates lifting along the chassis 12 such that the chassis 12 can be manipulated as a subassembly for assembly and/or maintenance of the concrete mixer truck 10. One or more components may be coupled to the chassis 12 using isolating mounts made of a complaint material, such as rubber. The isolating mounts may be configured to reduce the transfer of vibrations between the components and the chassis 12.

The frame 28 includes a pair of frame rails 40 coupled with intermediate cross members, according to an exemplary embodiment. The frame rails 40 extend in a generally-horizontal and longitudinal direction (e.g., extend within 10 degrees of perpendicular relative to a vertical direction, extend within ten degrees of parallel relative to a ground surface when concrete mixer truck 10 is positioned on flat ground, etc.) between the front end 22 and the rear end 24. The frame rails 40 may be elongated "C-channels" or tubular members, according to various exemplary embodiments. In other embodiments, the frame rails 40 include another type of structural element (e.g., monocoque, a hull, etc.). In still other embodiments, the frame rails 40 include a combination of elongated C-channels, tubular members, a monocoque element, and/or a hull element. A first frame rail 41 of the frame rails 40 may be disposed along a first lateral side 142 and a second frame rail 43 of the frame rails 40 may be disposed along a second lateral side 144, respectively, of the concrete mixer truck 10. By way of example, the first lateral side 142 of the chassis 12 may be the left side of the concrete mixer truck 10 (e.g., when an operator is sitting in the cab 18 and positioned to drive the concrete mixer truck 10, etc.) and the second lateral side 144 of the chassis 12 may be the right side of the concrete mixer truck 10 (e.g., when an operator is sitting in the cab 18 and positioned to drive the concrete mixer truck 10, etc.).

The cab 18 is coupled to the frame rails 40 proximate the front end 22 of the chassis 12. According to various embodiments, the cab 18 (e.g., operator cabin, front cabin, etc.) is configured to house one or more operators during operation of the concrete mixer truck 10 (e.g., when driving, when dispensing concrete, etc.), and may include various components that facilitate operation and occupancy of the concrete mixer truck 10 (e.g., one or more seats, a steering wheel, control panels, screens, joysticks, buttons, accelerator, brake, gear lever, etc.). The cab 18 includes a housing 70 that forms the structure of the cab 18. At least one door 116 is affixed to the housing 70 to allow an operator to enter and exit the cab 18. A windshield 128 is disposed along a front side of the housing 70, near the front end 22, and above a front bumper 158 of the concrete mixer truck 10. The windshield 128 is configured to provide visibility to the operator while driving the concrete mixer truck 10, operating a main chute 46, and completing other tasks. The front bumper 158 may be affixed to a bottom portion of the housing 70. In some embodiments, the front bumper 158 is affixed to the frame 28 at the front end 22 of the concrete mixer truck 10.

A control assembly 76 is disposed within the cab 18 and is configured to control one or more components of the concrete mixer truck 10. The control assembly 76 may include controls, buttons, joysticks, and other features that control the movement and orientation of the concrete mixer truck 10, the hopper assembly 8, the main chute 46, a charge hopper 42, a discharge hopper 44, the mixing drum 14, and/or other components of the concrete mixer truck 10. For example, the control assembly 76 may include overhead controls (e.g., in a forward overhead position) that allow an occupant of the cab 18 to toggle a switch from a 'Close' position to an 'Open' position to open and close the charge hopper 42 and/or the discharge hopper 44. In some embodiments, the control assembly 76 includes a user interface with a display and an operator input. The display may be configured to display a graphical user interface, an image, an icon, or still other information. In one embodiment, the display includes a graphical user interface configured to provide general information about the concrete mixer truck 10 (e.g., vehicle speed, fuel level, warning lights, etc.). The graphical user interface may also be configured to display a current mode of operation, various potential modes of operation, or still other information relating to a transmission, modules, the drive system 20, and/or other components of the concrete mixer truck 10.

An air tank 96 is coupled to and supported by the chassis 12 and positioned directly beneath the mixing drum 14. The air tank 96 is configured to store compressed air (e.g., for use in an air brake system, for use when raising and lowering a pusher axle assembly, etc.). A water tank 90 extends laterally across the length of the chassis 12, forward of the air tank 96. The water tank 90 is coupled to the frame rails 40 and positioned beneath the mixing drum 14. The water tank 90 may be used to supply water to wash the concrete mixer truck 10 after pouring a concrete load and/or to add water to the concrete within the mixing drum 14 at the construction site and/or during transit, among other uses.

The drum assembly 6 is configured to store, mix and dispense concrete. The drum assembly 6 includes the mixing drum 14, a drum driver 114, and the hopper assembly 8. The mixing drum 14 extends longitudinally along a majority of the length of concrete mixer truck 10 and may be angled relative to the frame rails 40 (e.g., when viewed from the side of concrete mixer truck 10). The mixing drum 14 has a first end 36 that is positioned toward the front end 22 of the concrete mixer truck 10 and coupled to the front pedestal 16 (e.g., support post, support column, etc.). The first end 36 may at least partially extend over the cab 18. The first end 36 defines a drum opening 72 in communication with the hopper assembly 8 through which concrete may flow (e.g., between the charge hopper 42, the mixing drum 14, the discharge hopper 44, the main chute 46, and extension chutes 48, etc.). The mixing drum 14 has a second end 38 that is positioned toward the rear end 24 of the concrete mixer truck 10 and coupled to the rear pedestal 26 (e.g., support post, support column, etc.). The mixing drum 14 may be rotatably coupled to front pedestal 16 (e.g., with a plurality of wheels or rollers, etc.) and rear pedestal 26 (e.g., with a drum drive transmission, etc.). Each of the front pedestal 16 and the rear pedestal 26 may be a part of a superstructure of the concrete mixer truck 10. The superstructure further includes the frame 28 and the chassis 12. In other embodiments, the mixing drum 14 is otherwise coupled to the frame rails 40.

In another embodiment, the mixer vehicle 10 can include a drum assembly 6 having a different discharge arrangement. For example, the mixer vehicle 10 can include a rear discharge. A rear discharge mixer vehicle 10 can have the mixing drum 14 with the first end 36 positioned toward the rear end 24 of the mixer vehicle 10 and coupled with the rear pedestal 26. The first end 36 can define the drum opening 72 in communication with the hopper assembly 8 through which concrete can flow. In some embodiments, the mixer vehicle 10 can include a ladder 98 that extends down from the side of the hopper assembly 8 to provide access to the first end 36 of the mixing drum 14. The mixing drum 14 can have the second end 38 positioned toward the front end 22 of the mixer vehicle 10 and coupled with the front pedestal 16.

The front pedestal 16 includes an upper portion 152 and a lower portion 154. The upper portion 152 is coupled to and supports the hopper assembly 8. The lower portion 154 is coupled to the frame rails 40 and supports the upper portion 152 of the front pedestal 16 and the first end 36 of the mixing drum 14. The rear pedestal 26 includes an upper portion 162 and a lower portion 164. The lower portion 164 is coupled to the frame rails 40 and supports the upper portion 162. The upper portion 162 supports a bottom interface of a drum drive transmission 140 (e.g., a bottom portion of the housing thereof) and/or the second end 38 of the mixing drum 14. In some embodiments, the rear pedestal 26 includes a pair of legs extending between the frame rails 40 and the drum drive transmission 140.

The drum opening 72 at the first end 36 of the mixing drum 14 is configured to receive a mixture, such as a concrete mixture, or mixture ingredients (e.g., cementitious material, aggregate, sand, etc.) such that the mixture can enter and exit an internal volume 30 of the mixing drum 14. The mixing drum 14 may include a mixing element (e.g., fins, etc.) positioned within the internal volume 30. The mixing element may be configured to (i) agitate the contents of mixture within the mixing drum 14 when the mixing drum 14 is rotated in a first direction (e.g., counterclockwise, clockwise, etc.) and (ii) drive the mixture within the mixing drum 14 out through the drum opening 72 when the mixing drum 14 is rotated in an opposing second direction (e.g., clockwise, counterclockwise, etc.). During operation of the concrete mixer truck 10, the mixing elements of the mixing drum 14 are configured to agitate the contents of a mixture located within the internal volume 30 of the mixing drum 14 as the mixing drum 14 is rotated in a counterclockwise and/or a clockwise direction by the drum driver 114.

The drum driver 114 is configured to provide an input (e.g., a torque, etc.) to the mixing drum 14 to rotate the mixing drum 14 relative to the chassis 12. The drum driver 114 may be configured to selectively rotate the mixing drum 14 clockwise or counterclockwise, depending on the mode of operation of the concrete mixer truck 10 (i.e., whether concrete is being mixed or dispensed). The drum driver 114 is coupled to a rear or base portion of the second end 38 of the mixing drum 14 and a top end of the lower portion 164 and/or a lower end of the upper portion 162 of the rear pedestal 26. The drum driver 114 includes a transmission, shown as drum drive transmission 140, and a driver, shown as drum drive motor 130, coupled to drum drive transmission 140. The drum drive transmission 140 extends rearward (e.g., toward the rear end 24 of the concrete mixer truck 10, toward the engine module 110, etc.) from the second end 38 of mixing drum 14 and the drum drive motor 130 extends rearward from drum drive transmission 140. In some embodiments, the drum drive motor 130 is a hydraulic motor. In other embodiments, the drum drive motor 130 is another type of actuator (e.g., an electric motor, etc.). The drum drive motor 130 is configured to provide an output torque to the drum drive transmission 140, according to an exemplary embodiment, which rotates the mixing drum 14 about a rotation axis. The drum drive transmission 140 may include a plurality of gears (e.g., a planetary gear reduction set, etc.) configured to increase the turning torque applied to the mixing drum 14, according to an exemplary embodiment. The plurality of gears may be disposed within a housing. In some embodiments, a drum drive pump and/or accessory pump may be configured to receive rotational mechanical energy and output a flow of pressurized hydraulic fluid to drive one or more components of the concrete mixer truck 10.

The hopper assembly 8 is positioned at the drum opening 72 of the mixing drum 14. The hopper assembly 8 is configured to introduce materials into and allow the materials to flow out of the internal volume 30 of the mixing drum 14 of the concrete mixer truck 10. The hopper assembly 8 is configured to prevent loss of material or spillage when the material enters and exits the mixing drum 14. The hopper assembly 8 includes the charge hopper 42, the discharge hopper 44, a hopper actuator 66, a platform 54, and the main chute 46, which, in a front discharge mixer vehicle 10, are positioned above at least partially forward of the cab 18 of the concrete mixer truck 10. The charge hopper 42 is configured to direct the materials (e.g., cement precursor materials, etc.) into the drum opening 72 of the mixing drum 14. The discharge hopper 44 is configured to dispense mixed concrete from the internal volume 30 of the mixing drum 14 to the main chute 46 and, ultimately, the desired location.

The platform 54 includes a perforated surface that surrounds the charge hopper 42 and the discharge hopper 44. In some embodiments, the platform 54 includes an asymmetric base. The platform 54 includes platform sides extending beneath the perforated surface. A guardrail 56 is coupled to the platform 54 and follows the contour of a periphery of the platform 54. The platform 54 is situated at a position near the drum opening 72 of the mixing drum 14 to facilitate access by the operator to the drum opening 72, the internal volume 30, the charge hopper 42, the discharge hopper 44, and/or the main chute 46. In some embodiments, the concrete mixer truck 10 includes a ladder 98 that extends downward from a side of the platform 54 to allow an operator to climb and reach the platform 54.

The charge hopper 42 includes a first portion 52 that is configured to receive materials during a charging/loading operation. The first portion 52 has a rim 58 (e.g., opening) formed at a free end of the first portion 52. The charge hopper 42 includes a second portion 53 aligned with the bottom of the first portion 52. According to an exemplary embodiment, the charge hopper 42 is selectively repositionable/movable. In some embodiments, the charge hopper 42 is configured to rotate about a horizontal, lateral axis. In some embodiments, the charge hopper 42 is configured to raise and lower vertically. Specifically, the charge hopper 42 is configured to lift, pivot, or otherwise move between a first position (e.g., a lowered position, loading position, a charging position, etc.) and a second position (e.g., a raised position, a dispensing position, a pivoted position, etc.) above or shifted from the first position. In the first position, the charge hopper 42 is configured to direct material (e.g., concrete, etc.) from a source positioned above the concrete mixer truck 10 (e.g., a batch plant, etc.) through the drum opening 72 and into the internal volume 30 of the mixing drum 14. The first position may also facilitate transport of the concrete mixer truck 10 by lowering the overall height of the concrete mixer truck 10. In the second position, the charge hopper 42 moves (e.g., lifts, pivots, etc.) away from the drum opening 72 and facilitates material flowing unobstructed out of the drum opening 72 and into the discharge hopper 44 and the main chute 46.

A hopper actuator 66 is positioned to move the charge hopper 42 between the first position and the second position. The hopper actuator 66 facilitates selectively controlling movement of the charge hopper 42 between the first position and the second position. The hopper actuator 66 is coupled to and extends between the charge hopper 42 and the platform 54. In some embodiments, the hopper actuator 66 is a hydraulic cylinder. In other embodiments, the hopper actuator 66 is another type of actuators (e.g., a pneumatic cylinder, a lead screw driven by an electric motor, an electric motor, etc.).

When receiving the material, the charge hopper 42 may be in the first position and the main chute 46 may be in a first configuration (e.g., a transport configuration, a stored configuration, etc.). Accordingly, material can be deposited into the charge hopper 42, and the charge hopper 42 directs the material into the internal volume 30 of the mixing drum 14 through the drum opening 72. While material is being added to the mixing drum 14, the drum driver 114 may be operated to drive the mixing drum 14 to agitate the material and facilitate fully loading/packing the mixing drum 14. Alternatively, the mixing drum 14 may be stationary while material is added to the mixing drum 14. When discharging and the charge hopper 42 is in the second position, the discharge hopper 44 funnels material from the mixing drum 14 into the main chute 46.

The main chute 46 functions as an outlet of the mixing drum 14 and is used to direct concrete dispensed from the internal volume 30 of the mixing drum 14 and through the discharge hopper 44 to a target location near the concrete mixer truck 10. The main chute 46 is pivotally coupled to the platform 54 and/or the discharge hopper 44 such that the main chute 46 is configured to rotate about both a vertical axis and a horizontal axis. The main chute 46 includes a base section 124 that may be pivotally coupled to the platform 54 and/or the discharge hopper 44. An extension chute 48 (e.g., a folding section, a second chute section, etc.) is pivotally coupled to the distal end of the base section 124. In some embodiments, a plurality of extension chutes 48 are pivotally connected to one another. One or more removable/detachable extension chutes 68 may be selectively coupled to the distal end of the extension chute 48.

The main chute 46 is selectively reconfigurable between a first configuration (e.g., a storage configuration, a transport configuration, etc.) and a second configuration (e.g., a use configuration, a dispensing configuration, etc.). In the first configuration, (i) the base section 124 may be selectively oriented substantially horizontal and extending laterally outward, (ii) the extension chute 48 may be selectively pivoted relative to the base section 124 and extending substantially vertically, and (iii) the removable extension chutes 68 may be removed from the extension chute 48 and stored elsewhere in the concrete mixer truck 10 (e.g., coupled to the chassis 12 beneath the mixing drum 14, etc.). In the first configuration, the main chute 46 may, therefore, minimally obscure the view of an operator positioned within the cab 18 of a front discharge mixer vehicle 10. In the second configuration, (i) the extension chute 48 may be pivoted relative to the base section 124 from the substantially vertical orientation to a substantially horizontal orientation such that the base section 124 and the extension chute 48 are aligned with one another to form a continuous path through which material can flow, and (ii) one or more of the removable extension chutes 68 may be coupled to the distal end of the extension chute 48 to increase the length of the main chute 46 (e.g., to distribute concrete further away from the concrete mixer truck 10, etc.).

A first chute actuator 122 (e.g., a chute raising/lowering actuator, etc.) is coupled to and extends between the main chute 46 (e.g., a distal end thereof, etc.) and the chassis 12. In some embodiments, the first chute actuator 122 is extends between the main chute 46 and the front bumper 158. The first chute actuator 122 is configured to raise and lower the main chute 46 to control the orientation of the main chute 46 relative to a horizontal plane (e.g., the ground, etc.). In some embodiments, the first chute actuator 122 is a pair of opposing hydraulic cylinders. In other embodiments, the first chute actuator 122 is another type of actuator (e.g., a pneumatic cylinder, a lead screw driven by an electric motor, a single hydraulic cylinder, etc.). In some embodiments, the first chute actuator 122 and the main chute 46 are both configured to rotate about the same or substantially the same vertical axis (e.g., as the main chute 46 is pivoted about the vertical axis as described in more detail herein).

A second chute actuator 94 (e.g., a chute pivot/rotation actuator, etc.) is coupled to the base section 124 of the main chute 46 and the platform 54. The second chute actuator 94 is configured to rotate the main chute 46 about a vertical axis. The second chute actuator 94 is configured to move the distal end of the main chute 46 through an arc along the left, front, and right sides of the chassis 12 (e.g., a 150 degree arc, a 180 degree arc, a 210 degree arc, etc.). In one embodiment, the second chute actuator 94 is a hydraulic motor. In other embodiments, the second chute actuator 94 is another type of actuator (e.g., a pneumatic motor, an electric motor, etc.).

A third chute actuator 78 (e.g., a chute folding/unfolding actuator, etc.) is configured to reposition (e.g., extend and retract, fold and unfold, etc.) the extension chute 48 relative to the base section 124 of the main chute 46. The third chute actuators 78 may be coupled to and extend between the base section 124 and the extension chute 48. In some embodiments, the third chute actuator 78 includes a plurality of actuators positioned to reposition a first extension chute 48 relative to the base section 124 and one or more second extension chutes 48 relative to the first extension chute 48. The first chute actuator 122, the second chute actuator 94, and the third chute actuator 78 facilitate selectively reconfiguring the main chute 46 between the first configuration and the second configuration. In some embodiments, a controller (e.g., joystick) is configured to facilitate providing commands to control operation of the first chute actuator 122, the second chute actuator 94, and the third chute actuator 78 to direct the main chute 46 and concrete flow therefrom. In some embodiments, a hopper pump may be coupled to the chassis 12 and configured to provide pressurized hydraulic fluid to power the first chute actuator 122, the second chute actuator 94, and/or the third chute actuator 78. The hopper pump may be a variable displacement pump or a fixed displacement pump. Additionally or alternatively, a pneumatic pump and/or an electrical storage and/or generation device is used to power one or more of the first chute actuator 122, the second chute actuator 94, and/or the third chute actuator 78.

Once at the job site, the concrete mixer truck 10 may be configured to dispense the material to a desired location (e.g., into a form, onto the ground, etc.). The charge hopper 42 may be repositioned into the second position from the first position by the hopper actuator 66. The extension chute(s) 48 may be extended by the third chute actuator(s) 78 to reconfigure the main chute 46 into the second configuration from the first configuration. An operator can then couple one or more removable extension chutes 68 to the distal end of the extension chute 48 to increase the overall length of the main chute 46 (as necessary). Once the main chute 46 is in the second configuration, the operator can control the first chute actuator 122 and/or the second chute actuator 94 to adjust the orientation of the main chute 46 (e.g., about a vertical axis, about a lateral axis, etc.) and thereby direct the material onto the desired location. Once the main chute 46 is in the desired orientation, the operator can control the drum driver 114 to rotate the mixing drum 14 in the second direction, expelling the material through the drum opening 72, into the discharge hopper 44, and into the main chute 46. The operator may control the speed of the mixing drum 14 to adjust the rate at which the material is delivered through the main chute 46. Throughout the process of dispensing the material, the operator can change the location onto which the material is dispensed by varying the orientation of the main chute 46 and/or by controlling the drive system 20 to propel/move the concrete mixer truck 10.

The drive system 20 is configured to propel the concrete mixer truck 10 and may drive other systems of the concrete mixer truck 10 (e.g., the drum driver 114, etc.). The drive system 20 includes driven tractive assemblies that include a front axle assembly 132 and a pair of rear axle assemblies 134, each coupled to various wheels 4. In some embodiments, the drive system 20 includes a driveshaft coupled to the front axle assembly 132 and/or the rear axle assemblies 134. The front axle assembly 132 and the rear axle assemblies 134 are coupled to the power plant module 62 through the drive system 20 such that the front axle assembly 132 and the rear axle assemblies 134 at least selectively receive mechanical energy (e.g., rotational mechanical energy) and propel the concrete mixer truck 10. In some embodiments, a pusher axle assembly 168 (e.g., tag axle assembly, etc.) is configured to be raised and lowered to selectively engage the support surface (e.g., based on the loading of the concrete mixer truck 10, etc.). Such a configuration distributes the pressure exerted on the ground by the concrete mixer truck 10, which may be required, for example, when traveling through certain municipalities under load.

The power plant module 62 (e.g., prime mover module, driver module, etc.) is configured to supply rotational mechanical energy to drive the concrete mixer truck 10. The power plant module 62 is coupled to the chassis 12 and positioned near the longitudinal center of the concrete mixer truck 10, beneath the mixing drum 14. According to an exemplary embodiment, the power plant module 62 receives a power input from the engine module 110. In some embodiments, the power plant module 62 includes a transmission and/or an electromagnetic device (e.g., an electrical machine, a motor/generator, etc.) coupled to the transmission. In some embodiments, the transmission and the electromagnetic device are integrated into a single device (e.g., an electromechanical infinitely variable transmission, an electromechanical transmission, etc.). The electromagnetic device is configured to provide a mechanical energy input to the transmission. By way of example, the electromagnetic device may be configured to supply a rotational mechanical energy input to the transmission (e.g., using electrical energy generated from the mechanical power input provided by the engine module 110, etc.). In some embodiments, the power plant module 62 and/or the drive system 20 includes additional pumps (hydraulic fluid pumps, water pumps, etc.), compressors (e.g., air compressors, air conditioning compressors, etc.), generators, alternators, and/or other types of energy generation and/or distribution devices configured to transfer the energy from the power plant module 62 to other systems.

The fuel system 108 is configured to provide fuel to the engine module 110 and/or other components of the concrete mixer truck 10. Specifically, the fuel system 108 may be configured to provide fuel to an engine 74 of the engine module 110. The engine 74 may use the fuel in an internal combustion process to generate a mechanical power output that is provided to the power plant module 62 (e.g., to generate electricity, to power onboard electric motors used to at least one of rotate wheel and tire assemblies, to drive the transmission etc.) and/or to power the drum driver 114. The fuel system 108 may include one or more valves, hoses, regulators, filters, and/or various other components configured to facilitate providing fuel to the engine 74. The fuel system 108 includes a container 126 (e.g., a vessel, reservoir, tank, etc.) that is configured to store a fluid (e.g., fuel, air, hydraulic fluid, etc.). The container 126 is disposed behind the drum driver 114 along the chassis 12. In other embodiments, the container 126 is coupled to a side of the rear pedestal 26. In some embodiments, the container 126 is coupled to the chassis 12 and positioned directly beneath the mixing drum 14. According to an exemplary embodiment, the container 126 includes a fuel tank that stores fuel used to power the engine 74. In some embodiments, the container 126 additionally or alternatively includes an air tank configured to store compressed air (e.g., for use in an air brake system, for use when raising and lowering the pusher axle assembly 168, etc.). In some embodiments, the container 126 additionally or alternatively includes a hydraulic tank configured to store hydraulic fluid for use in one or more hydraulic circuits (e.g., a hydraulic circuit that includes the drum driver 114, etc.).

A cover assembly 120 including a plurality of cover panels is positioned between the second end 38 of the mixing drum 14 and the engine module 110. The cover assembly 120 is disposed around the fuel system 108 (e.g., the container 126, etc.), the drum driver 114, and the rear pedestal 26. The cover assembly 120 is configured to protect the various internal components from debris. Such debris may be encountered while the concrete mixer truck 10 is driven along a roadway, for example. The cover assembly 120 may also protect the various internal components from damage due to collisions with trees, poles, or other structures at a jobsite or while transporting concrete. In some embodiments, all or some of the fuel system 108 is incorporated under a hood 86 of the engine module 110.

The engine module 110 is coupled to the frame rails 40 proximate the rear end 24 of the chassis 12. The engine module 110 is configured to directly, or indirectly, supply the various components of the concrete mixer truck 10 with the power needed to operate the concrete mixer truck 10. By way of example, the engine module 110 may be configured to provide mechanical energy (e.g., rotational mechanical energy) (i) to one or more components directly (e.g., via a power-take-off, etc.) to drive the one or more components (e.g., a hydraulic pump of the drum driver 114, etc.) and/or (ii) to the power plant module 62 to drive the one or more components indirectly. The engine module 110 may be defined by any number of different types of power sources. According to an exemplary embodiment, the engine module 110 includes the engine 74 coupled to the frame rails 40 and disposed within the hood 86. The engine 74 may include an internal combustion engine configured to utilize one or more of a variety of fuels (e.g., gasoline, diesel, bio-diesel, ethanol, natural gas, etc.) to output mechanical energy. In some embodiments, at least one of the drum drive motor 130, the first chute actuator 122, the second chute actuator 94, and the third chute actuator 78 is electrically driven (i.e., powered using electrical energy) rather than hydraulically driven.

In some embodiments, the engine module 110 additionally or alternatively includes multiple battery modules (e.g., batteries, capacitors, ultra-capacitors, etc.) spread throughout the concrete mixer truck 10, which cooperate to act collectively as an energy storage device. The engine module 110 can be charged through an onboard energy source (e.g., through use of an onboard generator powered by an internal combustion engine, by operating the electromagnetic device as a generator, during regenerative braking, through an onboard fuel cell, through an onboard solar panel, etc.) or through an external energy source (e.g., when receiving mains power from a power grid, etc.). In some embodiments, the concrete mixer truck 10 is a purely electric vehicle that does not include an internal combustion engine and, as such, is driven by electrical energy in all modes of operation. In such embodiments, the concrete mixer truck 10 may not include a fuel tank.

Chassis

According to an exemplary embodiment, a frame configuration is described. The rearward cross-member configuration includes utilizing a rear cross-member and a front cross-member positioned forward of the rear cross-member to mount various concrete mixer truck components. A fluid tank is positioned between the frame rails in a lateral (e.g., transverse) direction and coupled to the front cross-member. Mounting the fluid tank between the frame rails reduces the exposure of the fluid tank to foreign objects and thereby reduces the likelihood of damage to the fluid tank. A remote fill is utilized to fill the fluid tank, and conduits to and from the tank are shortened because the fluid tank is in a central location along the chassis. A battery box is positioned between the front cross-member and rear cross-member rearward of the fluid tank. By mounting the battery box between the frame rails, the need for an additional mounting location and corresponding mounting components is eliminated, resulting in a lighter load on the chassis and reducing the number of components needed to house the batteries. Additionally, mounting the battery box in between the frame rails protects the battery box from damage. Specifically, the battery box does not extend outward from the side of the frame rail at the rear of the concrete mixer truck, like in conventional systems.

According to an exemplary embodiment, a front cross-member is described. The front cross-member is configured to couple to a steering assembly (e.g., axle assembly). This integrated design permits the steering gears to be moved rearward along the frame and placed directly a set of spring hangers, thereby reducing the front overhang of the steering assembly. By packaging all these components in a small area formed between the existing front cross-member and structure, this arrangement facilitates high steering cramp angles with large tires. Further packaging all these components together reduces the front overhang of the vehicle. Beneficially, the front cross-member is configured to be removable to facilitate access when servicing the steering assembly. The front cross-member may be configured to include a front leaf spring mounting, a chute pivot support mounting, a hydraulic chute control manifold, and a front vehicle recovery provision along with the steering assembly mounting.

According to an exemplary embodiment, an engine mount is described. The engine mount is positioned directly under the engine and couples the engine to the chassis, thereby reducing a cantilever effect on the mount. The engine mount implements a single isolator and is mounted directly to a cross-member of the chassis, thereby eliminating the need for additional cross-members, components, and mounting assemblies. Beneficially, the engine mount includes one or more chassis routings for HVAC routings, fuel filter mountings, and electrical clippings.

According to an exemplary embodiment, a routing assembly is described. The routing assembly includes an HVAC hose cluster, a tube assembly, and an electric cover that extends from the cab, along the frame rails, to the engine. Both the HVAC hose cluster and the tube assembly extend along internal portions of a respective rail in the frame rails. The routing assembly provides an organized and protected route for electrical, air, hydraulic, fuel, and HVAC connectors within the chassis, and the positions of the wires and hoses inside of the frame rails ensure that the frame rails protect these frame rails from exposure to foreign objects.

Rearward Cross-Member

Figure 4:
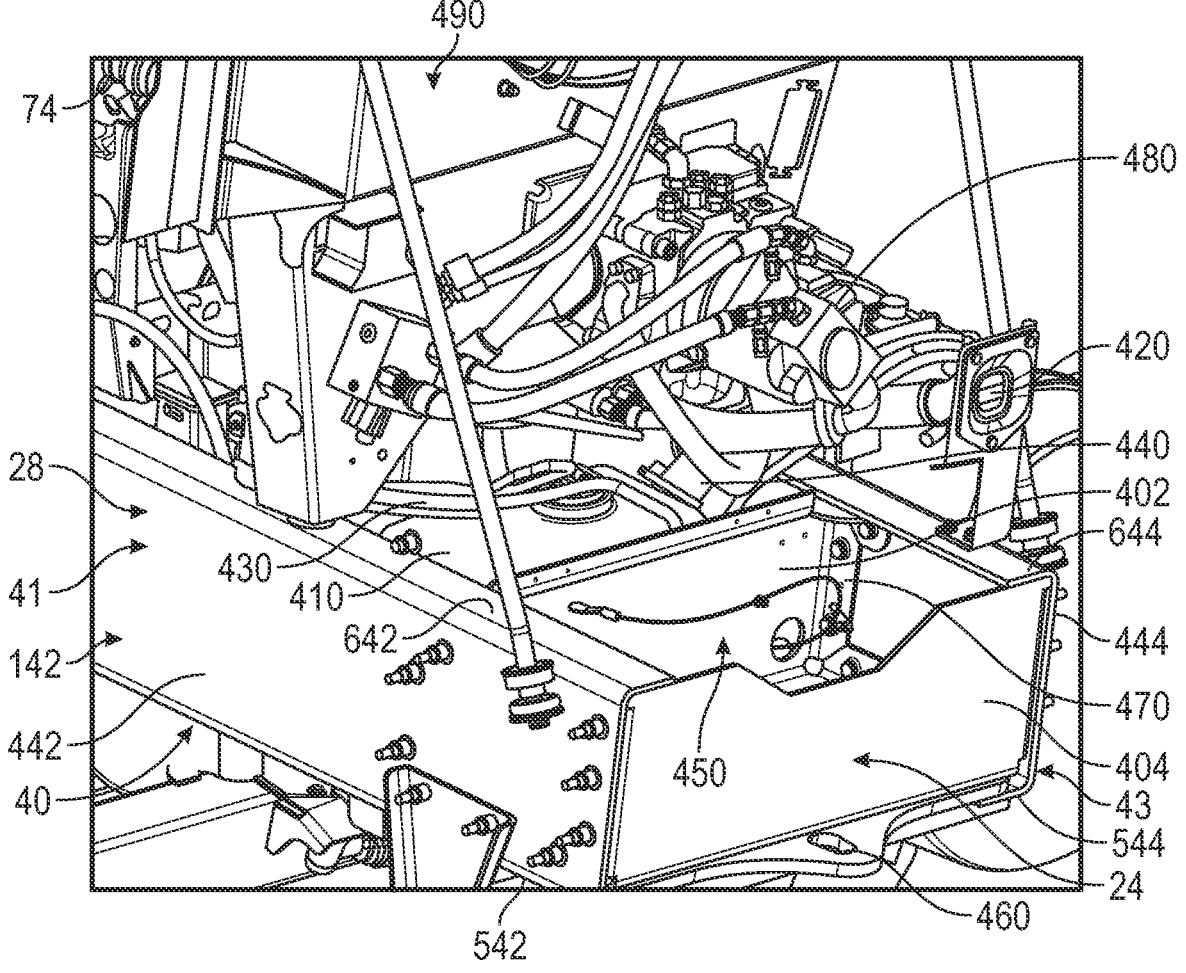
FIG. 4 is a top perspective view of a rearward cross-member of a chassis of the concrete mixer truck of FIG. 1A, according to an exemplary embodiment.
Figure 5:
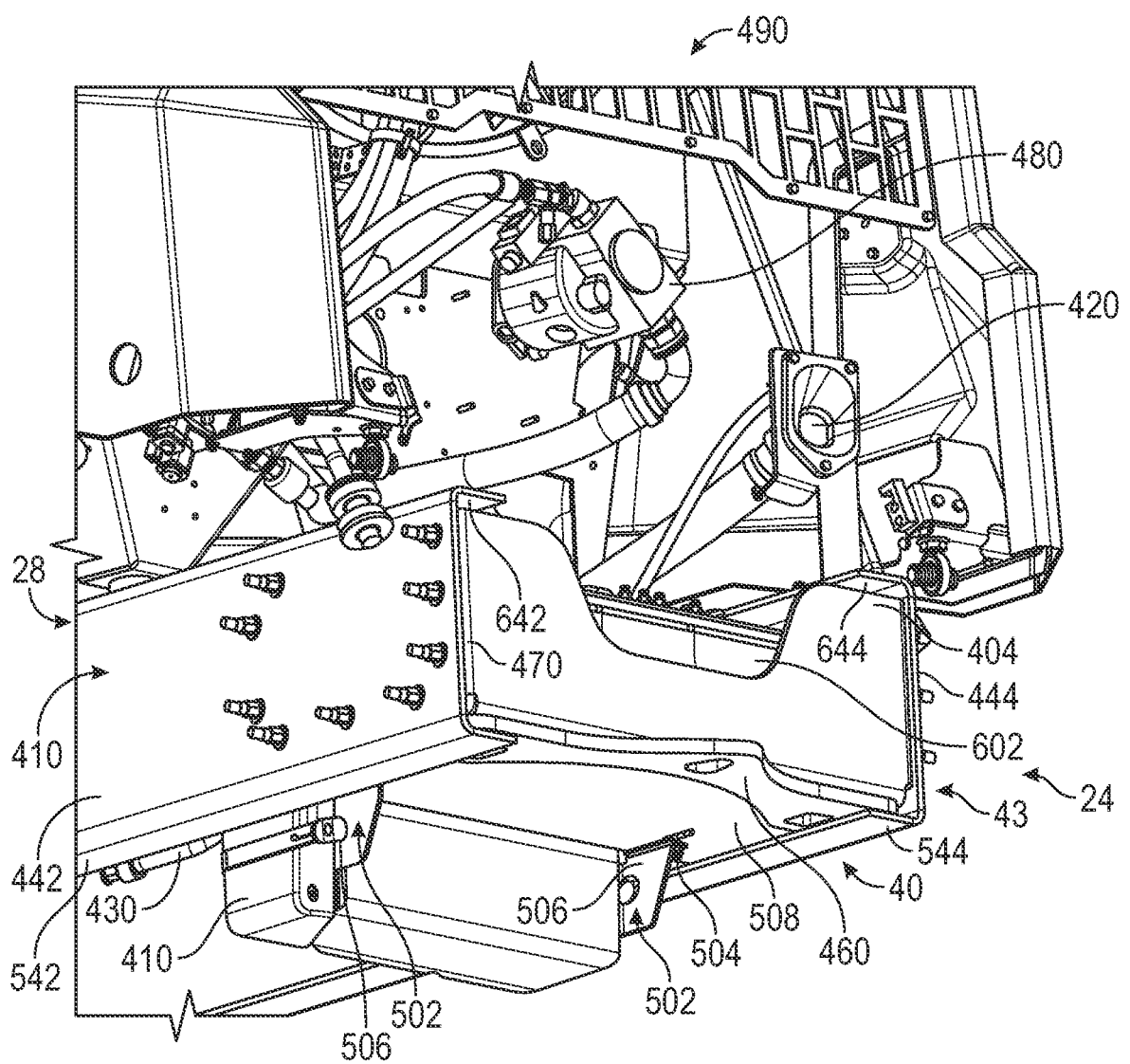
FIGS. 5 and 6 are various perspective views of the rearward cross-member of FIG. 4 with a battery box, according to an exemplary embodiment.
Figure 6:
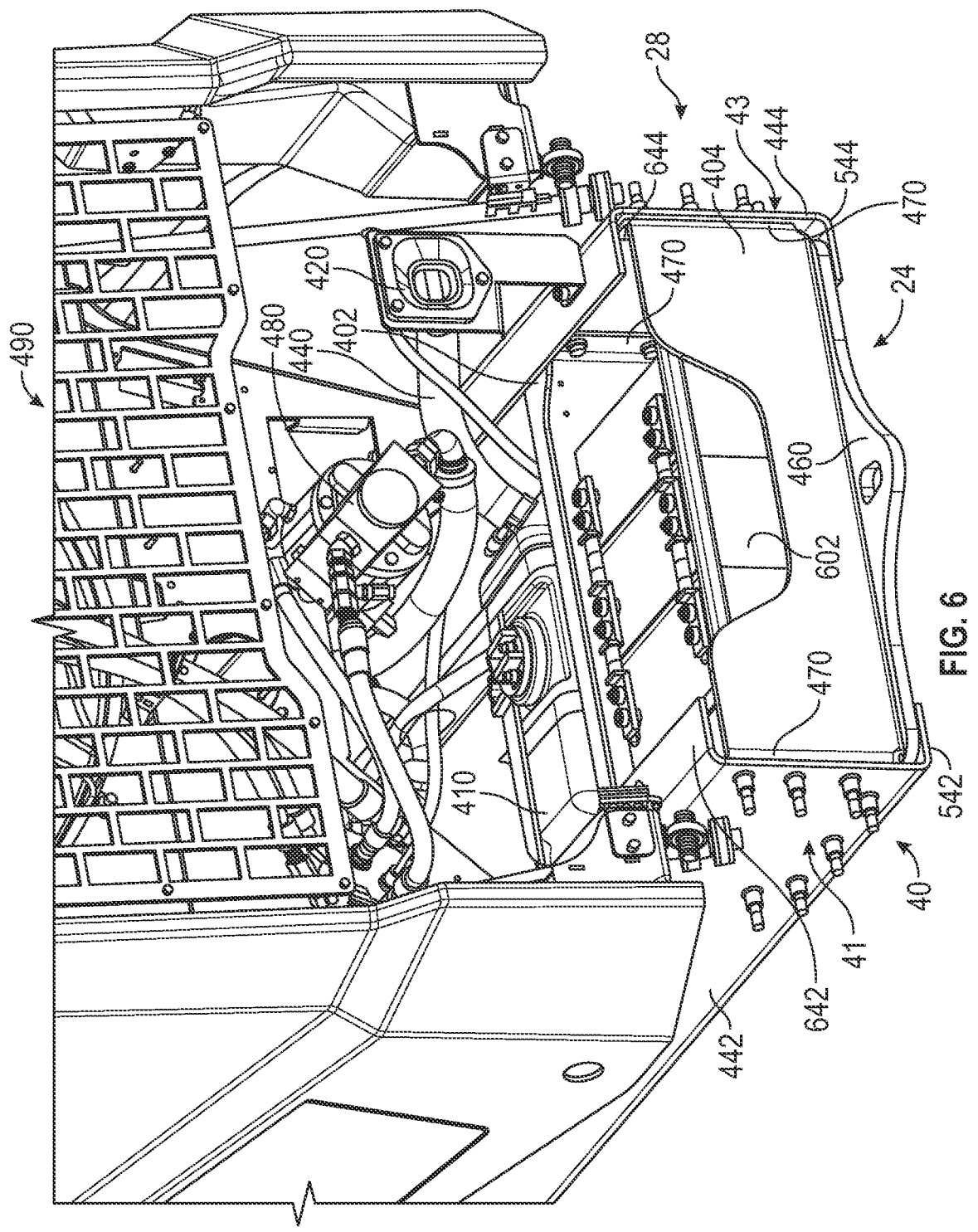

Referring to FIG. 4-6, the frame 28 includes a rearward cross-member configuration. The rearward cross-member configuration includes a pair of frame members, shown as cross-member 402 and rear cross-member 404. The cross-member 402 is positioned forward of the rear cross-member 404. As shown, the frame rails 40 each have a C-shaped cross-section (i.e., are C-channels) that includes a base and two legs oriented perpendicular to the base such that the legs define a horizontal width of the frame rail 40, and the base defines a vertical height of the frame rail 40. The first frame rail 41 on the first lateral side 142 includes a first base rail 442 (e.g., a base portion, a vertical portion, etc.), a first upper leg 642 (e.g., a horizontal portion, a protrusion, etc.), and a first lower leg 542 (e.g., a horizontal portion, a protrusion, etc.). The second frame rail 43 on the second lateral side 144 includes a second base rail 444, a second upper leg 644, and a second lower leg 544. In other embodiments, the frame rails 40 may have a different cross-sectional shape (e.g., tubular, etc.).

The cross-member 402 is coupled to the first base rail 442 and extends laterally toward, and is coupled to the second base rail 444. The cross-member 402 includes a pair of frame coupling members, shown as flanges 470, positioned on opposite ends of the cross member 402 and coupled to an interior surface of each frame rail. Specifically, the flanges 470 may be fastened (e.g., bolted), welded, fixed, etc., to the frame rails 40. As shown, the flanges 470 are bolted to the frame rails 40. The cross-member 402 may be made from a wide variety of materials (e.g., steel, aluminum, etc.) with wide variety of cross-sections (e.g., square tube, C-channel, angle, etc.). As shown in FIGS. 4-6 the cross-member 402 is generally C-shaped with the flanges 470 positioned at each end. The cross-member 402 is positioned substantially below (e.g., directly below) a cooling system 490 and a pump 480. The cross-member 402 is offset a longitudinal distance forward of the rear cross-member 404 such that a volume, shown as cross-member cavity 450, is positioned therebetween. A horizontal plate, shown as base plate 508 is coupled to the cross-member 402, the rear cross-member 404, and the frame rails 40 and defines the bottom of the cross-member cavity 450.

The rear cross-member 404 is coupled to the first base rail 442 and extends laterally toward, and is coupled to a second base rail 444. The rear cross-member 404 includes a pair of frame coupling members, shown as flanges 470, positioned on opposite ends of the cross member 402 and coupled to an interior surface of each frame rail. Specifically, the flanges 470 may be fastened (e.g., bolted), welded, fixed, etc., to the frame rails 40. As shown, the flanges 470 are bolted to the frame rails 40. The rear cross-member 404 may be made from a wide variety of materials (e.g., steel, aluminum, etc.) with wide variety of cross-sections (e.g., square tube, C-channel, angle, etc.). As shown in FIGS. 4-6, the cross-member 402 has a substantially flat base defining a tapered recess or opening at the top (e.g., two angled portions and a flat position disposed therebetween) and with a leg extending forward from the bottom of the base. The rear cross-member 404 is positioned at the rear end 24 of the concrete mixer truck 10.

Referring to FIGS. 4 and 5, a fluid tank 410 is coupled to the frame 29. The fluid tank 410 is positioned between the frame rails 40 and extends in a lateral (e.g., transverse) direction. The fluid tank 410 is positioned forward of the cross-member 402 and is coupled to a front side of the cross-member 402. The fluid tank 410 may be further coupled to the base plate 508 disposed under the cross-member cavity 450. As shown, a pair of brackets 502 may be used to couple the fluid tank 410 to the base plate 508. A strap 506 extends around a bottom portion of the fluid tank 410 from one bracket 502 to the other bracket 502, coupling the fluid tank 410 to the brackets 502. A series of fasteners 504 couple the brackets 502 to the base plate 508. In some embodiments, the fluid tank 410 is a diesel exhaust fluid (DEF) tank. In other embodiments the fluid tank 410 contains another type of fluid (e.g., water, fuel, hydraulic fluid, etc.). The fluid tank 410 is fluidly coupled to an outlet conduit 430 configured to provide fluid to one or more components (e.g., the engine 74, through the pump 480, etc.). An inlet conduit 440 is coupled to the fluid tank 410 and defines a remote fill opening 420 disposed near the rear end 24. The remote fill opening 420 permits an operator to pour a fluid into the remote fill opening 420 to fill the fluid tank 410.

Due to the positioning of the fluid tank 410 below the pump 480 and inside of the chassis 12, conduits to and from the fluid tank 410 are shortened and are protected by the frame rails 40 and other components along the chassis 12. In some embodiments, the pump 480 is configured to provide fluid from the fluid tank 410 to one or more components along the concrete mixer truck 10. Additionally, by mounting the fluid tank 410 between the frame rails 40 it reduces the exposure of the fluid tank 410 to the environment and therefore decreases the likelihood of damage. Conventionally, concrete mixer trucks position fluid tanks outside of a set of frame rails and near an engine. In contrast, the rearward cross-member configuration provides protection to the fluid tank 410 against intrusion from a wide variety of directions due to the protection provided by the frame rails 40.

Referring to FIGS. 5 and 6, a container, shown as battery box 602, is positioned in the cross-member cavity 450 between the frame rails 40 in a lateral (e.g., transverse) direction and is coupled to the rear cross-member 404. The battery box 602 may contain or include one or more energy storage devices, such as batteries or capacitors. In some embodiments, the battery box 602 is additionally or alternatively coupled to the cross-member 402. By positioning the battery box 602 between the frame rails 40, the exposure of the battery box 602 to the environment is reduced, and therefore the likelihood of damage to the battery box 602 and the need for a separate mounting structure is eliminated. In conventional concrete mixer trucks, a battery box is mounted to an exterior surface of a frame at the rear of the concrete mixer truck. In contrast, the rearward cross-member configuration utilizes existing structures to mount the battery box 602, thereby eliminating the need for an additional mounting location and corresponding mounting components and resulting in a lighter load onto the chassis 12 and reducing the number of components needed to house the batteries in the battery box 602.

The rearward cross-member configuration provides improvements over conventional concrete mixer truck designs. The rearward cross-member configuration provides structure to the chassis 12. In some embodiments, the rearward cross-member configuration provides mounting locations (e.g., apertures) for one or more LSTA auxiliary axles. In some embodiments, the rearward cross-member configuration provides one or more lift and/or tow provisions (e.g., tow points, lift points, apertures, mounts, etc.). As shown in FIGS. 5 and 6, the base plate 508 may includes a protrusion, shown as receiver 460, that extends outwardly away from the chassis 12. Specifically, the receiver 460 extends rearward of the rear cross-member 404. The receiver 460 is configured as an interface for a connection to another object (e.g., with a strap or chain), may facilitate towing (e.g., push, pull) another object, and/or for the vehicle to be towed. Specifically, the receiver 460 defines an aperture configured to receive one or more objects (e.g., hooks, straps, etc.).

Front Cross-Member

Figure 7:
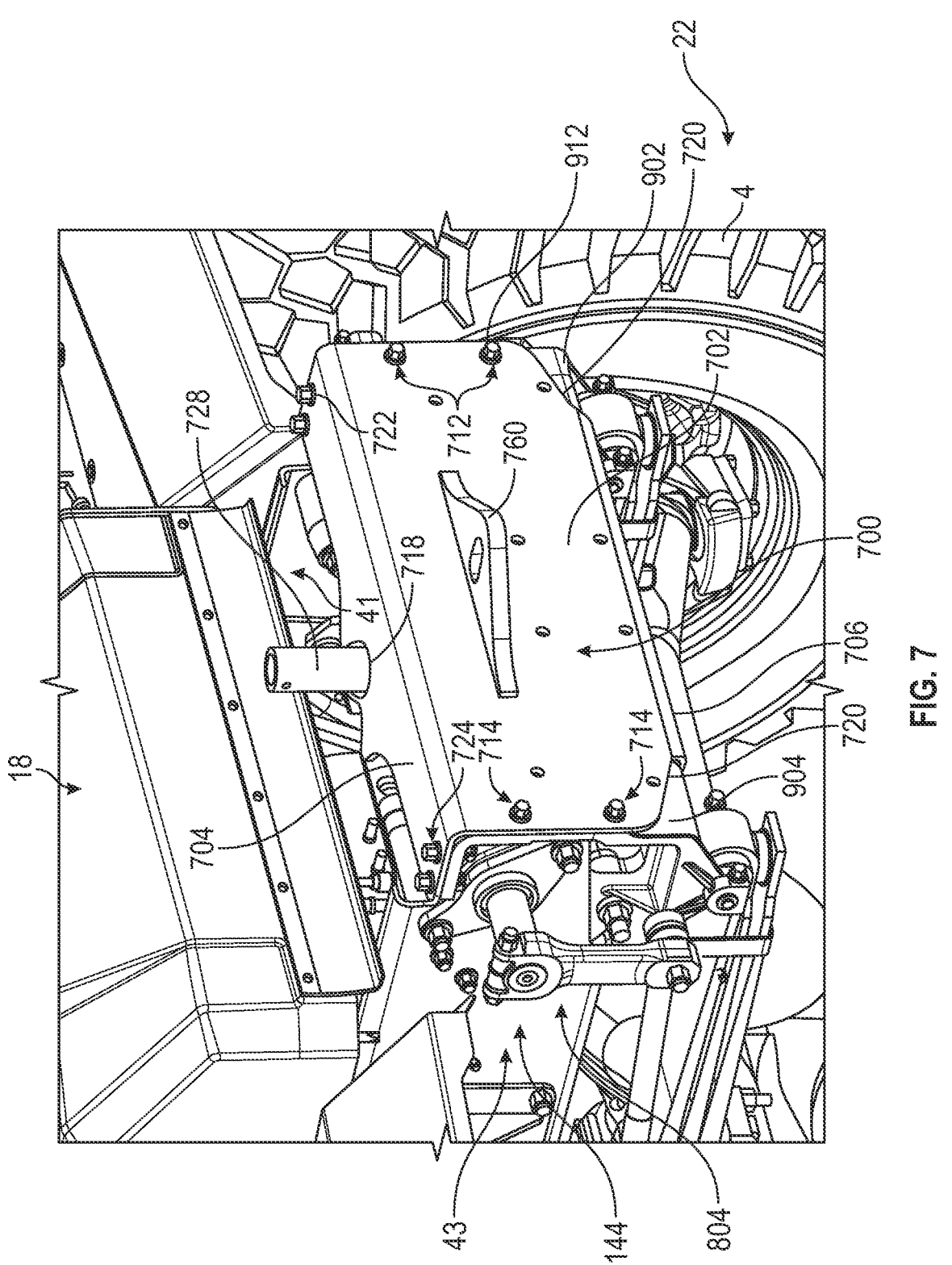
FIGS. 7 and 8 are various perspective views of a front cross-member and steering assembly of a chassis of the concrete mixer truck of FIG. 1A, according to an exemplary embodiment.
Figure 8:
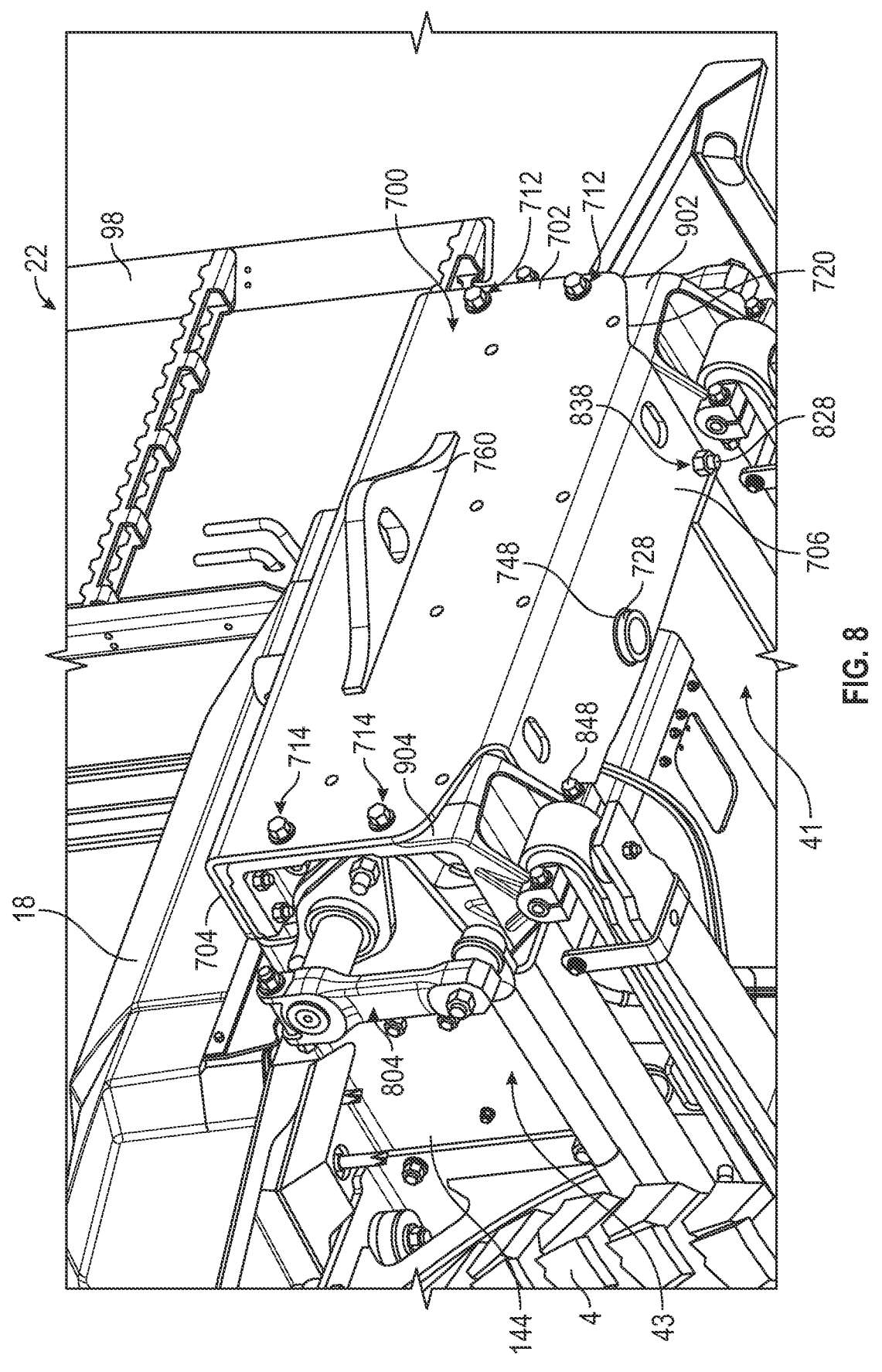
Figure 9:
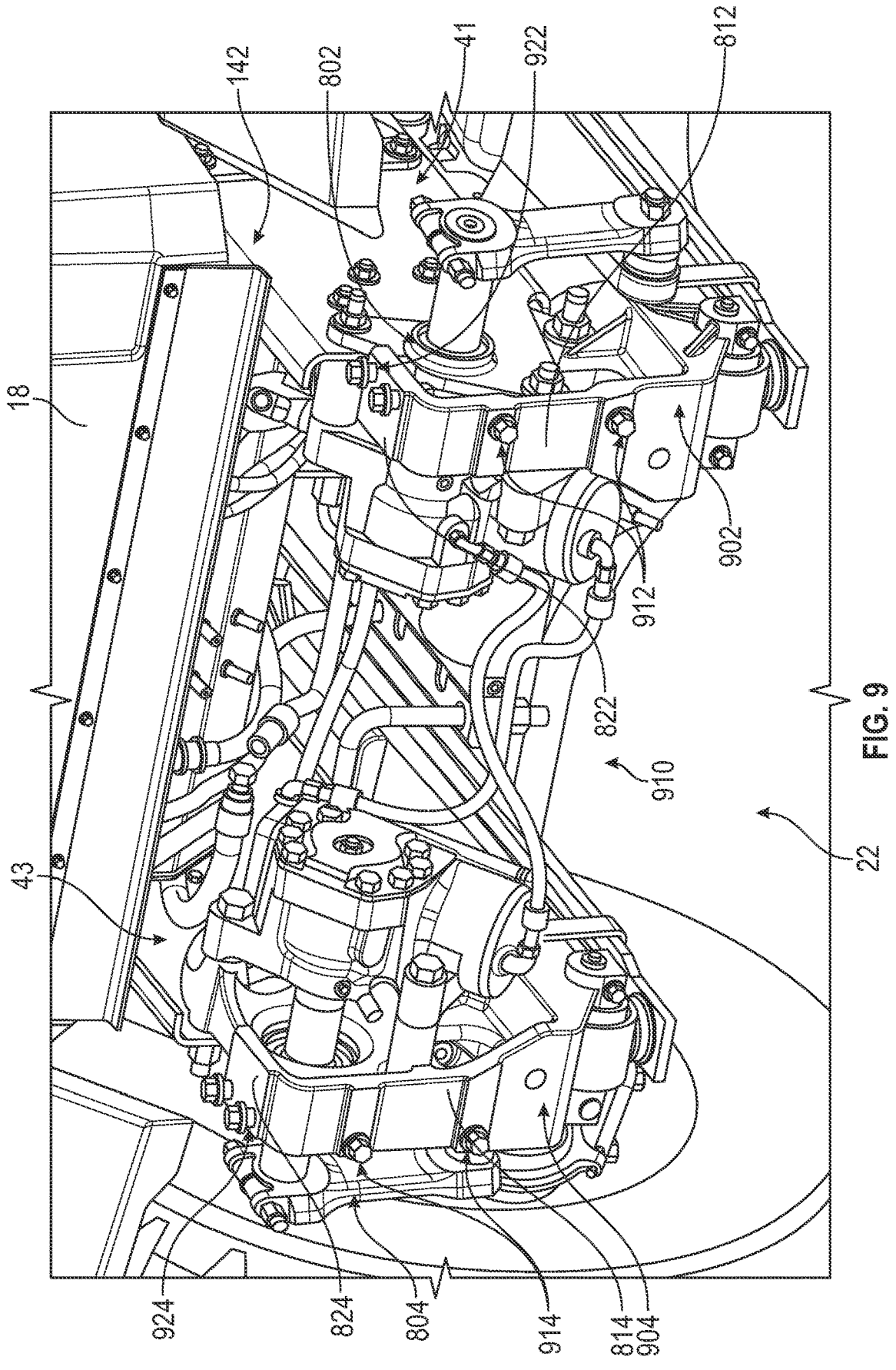
FIG. 9 is a top perspective view of the steering assembly of FIGS. 7 and 8, according to an exemplary embodiment.
Figure 10:
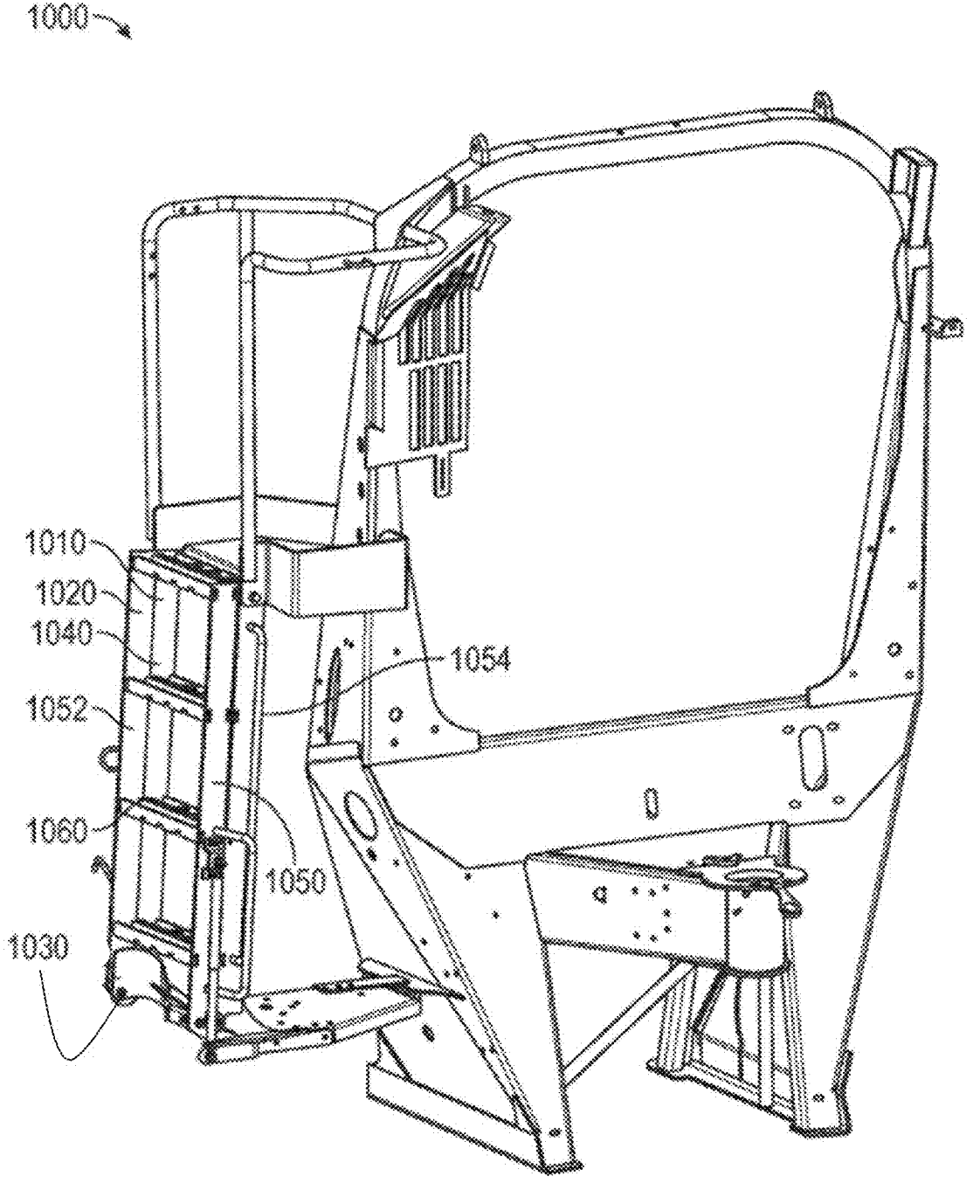
FIG. 10 is a perspective view of a ladder of FIG. 3, according to an exemplary embodiment.
Figure 11:
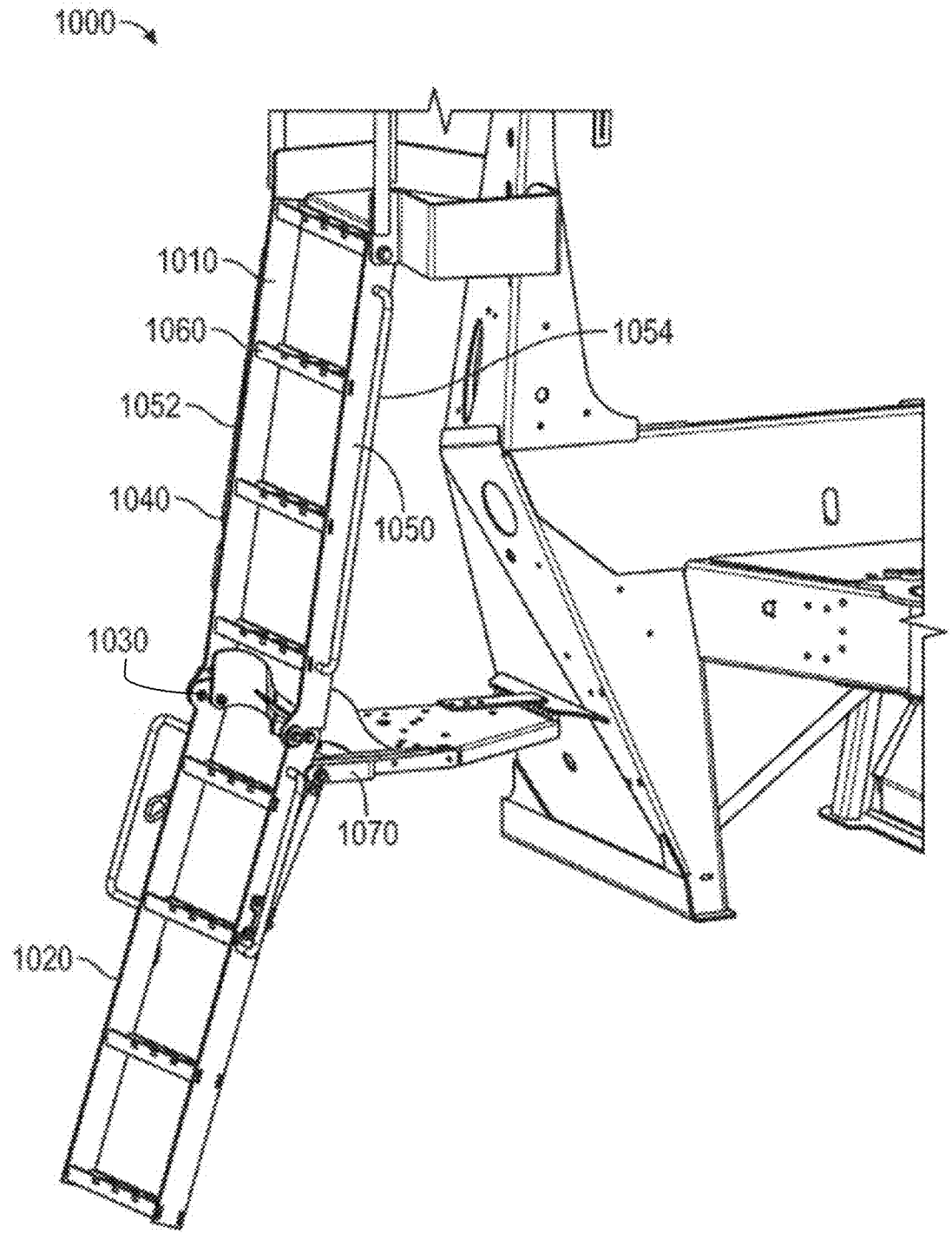
FIG. 11 is a perspective view of the ladder of FIG. 10, in a lowered position, according to an exemplary embodiment.
Figure 12:
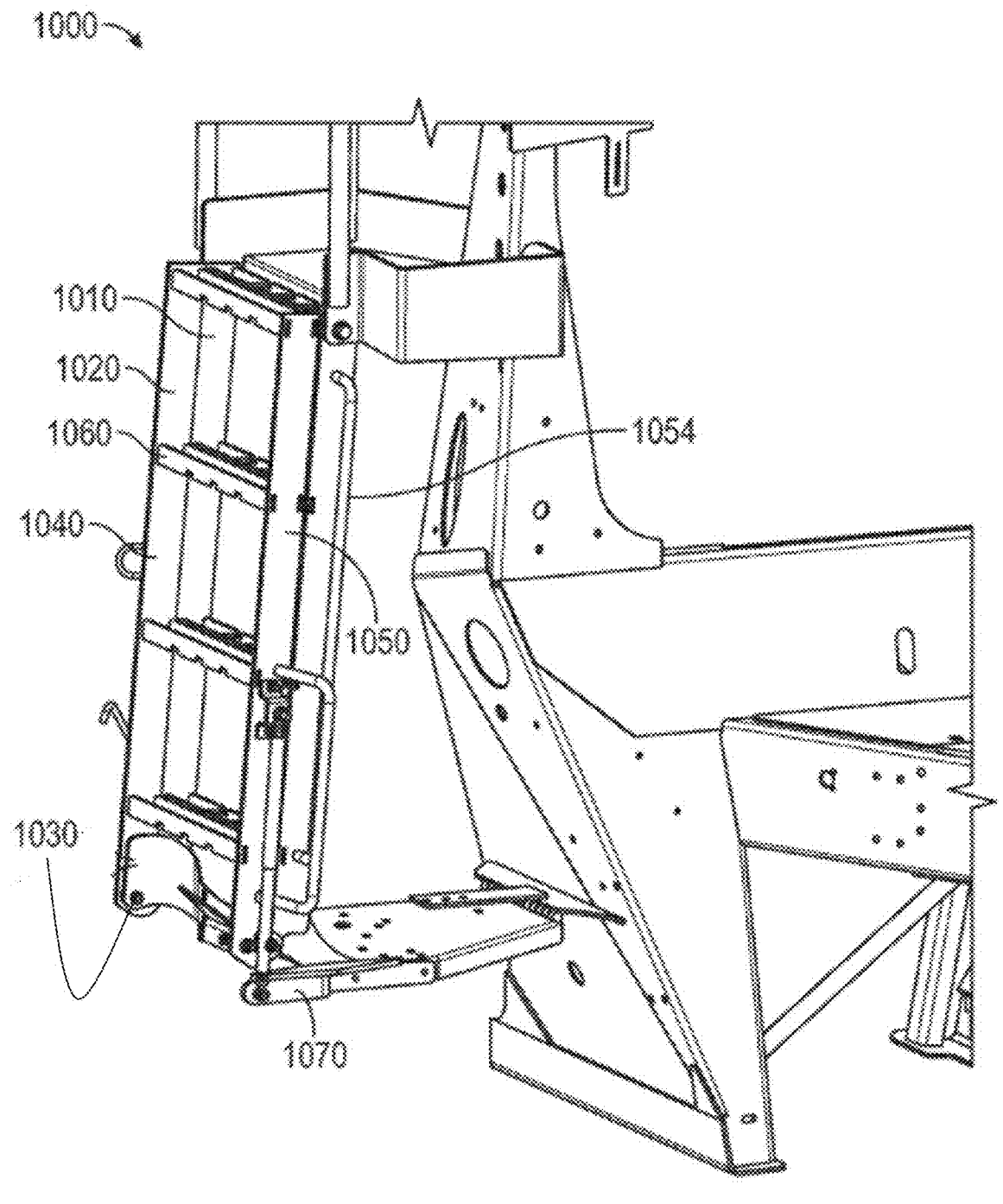
FIG. 12 is a perspective view of the ladder of FIG. 10, in a stowed position, according to an exemplary embodiment.
Figure 13:
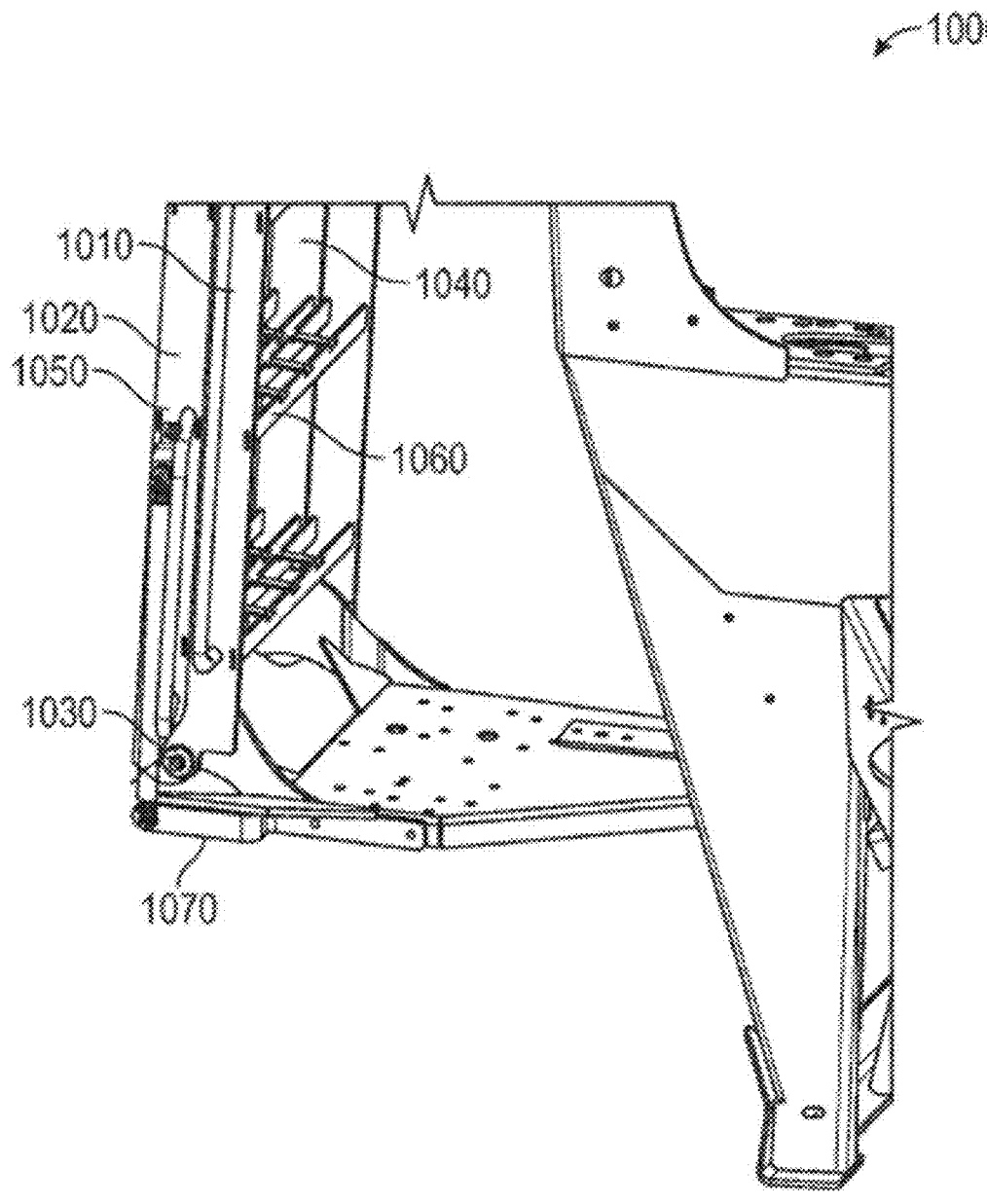
FIG. 13 is a detailed view of the ladder including a ladder assist of FIG. 10, in a stowed position, according to an exemplary embodiment.
Figure 14:
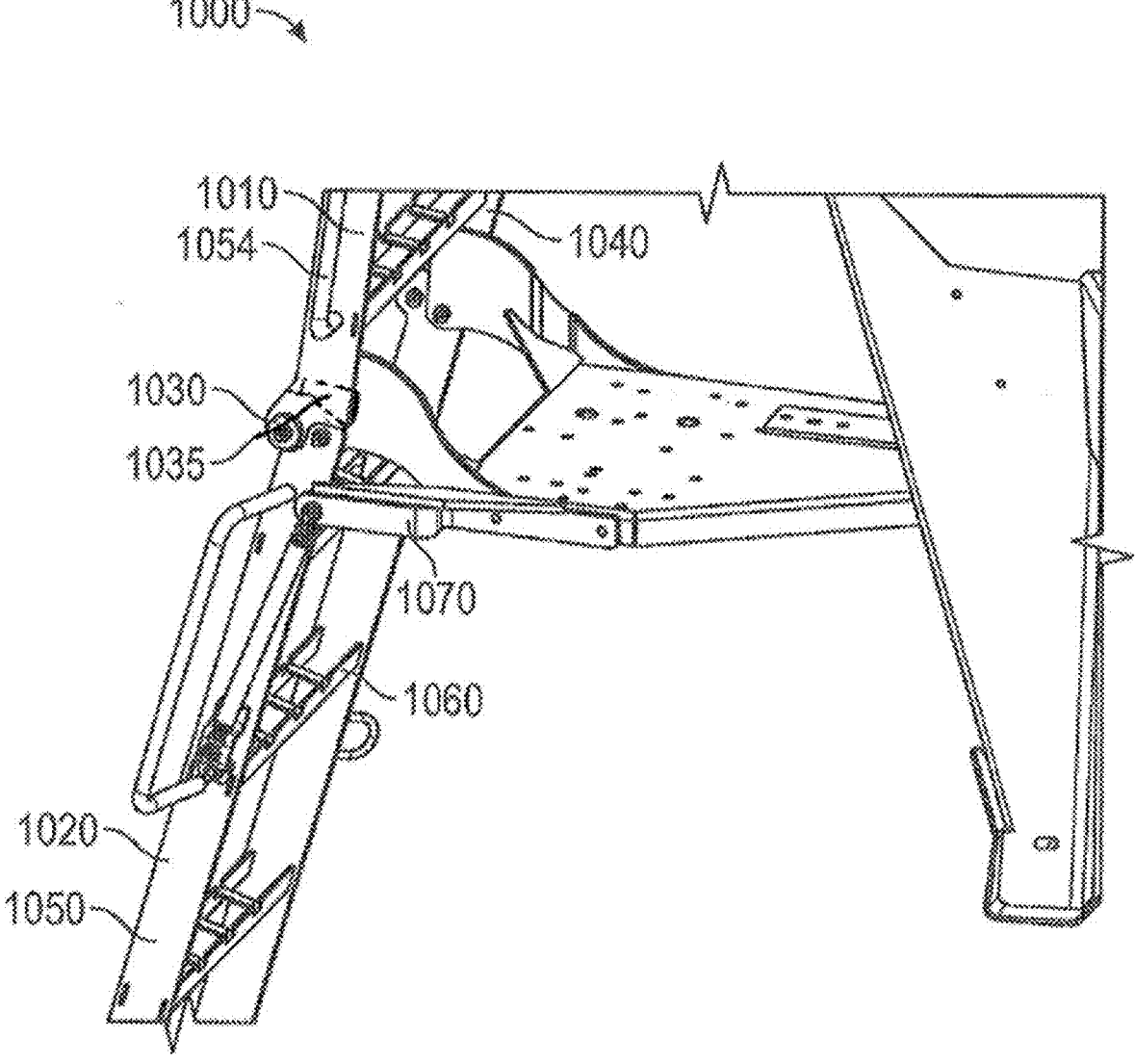
FIG. 14 is a detailed view of the ladder including a ladder assist of FIG. 10, in a lowered position, according to an exemplary embodiment.

Referring to FIGS. 7-9, the frame 28 includes a frame member, shown as front cross-member 700, according to an exemplary embodiment. The front cross-member 700 is configured to couple to a steering assembly 910 along the frame rails 40. The front cross-member 700 is positioned at the front end 22 of the concrete mixer truck 10 and is coupled to the steering assembly 910 adjacent the front end 22. The front cross-member 700 includes a base 702 (e.g., a base portion, a vertical portion, etc.), an upper leg 704 (e.g., a horizontal portion, a protrusion, etc.) oriented perpendicular to the base 702, and a lower leg 706 (e.g., a horizontal portion, a protrusion, etc.) oriented perpendicular to the base 702, parallel to and offset above the upper leg 704. The front cross-member 700 has a C-channel cross-section such that the upper leg 704 and a lower leg 706 define a width of the front cross-member 700, and the base 702 defines a height of the front cross-member 700. In other embodiments, the front cross-member 700 may have a different cross-sectional shape (e.g., tubular, etc.). As shown in FIG. 9, the steering assembly 910 is included as part of a first wheel assembly 802 and a second wheel assembly 804. The wheel assembly 802 and the wheel assembly 804 are configured to be connected with a drive shaft of the vehicle, receiving rotational energy from the engine 74 (e.g., prime mover) and allocating torque provided by the engine 74 between the half shafts and/or wheel assemblies. The half shafts and/or wheel assemblies deliver the rotational energy to each wheel-end assembly.

The first wheel assembly 802 includes a first wheel bracket 902 and may include various components of the drive system 20 including brakes, a gear reduction, steering components, a wheel hub, a wheel, and other features. The first wheel bracket 902 includes a first bracket face 812 and a first bracket leg 822. The first bracket face 812 is coupled to a pair of first front coupling members 912 (e.g., fasteners, bolts, etc.). The first bracket leg 822 is coupled to a pair of first upper coupling members 922 (e.g., fasteners, bolts, etc.). The second wheel assembly 804 includes a second wheel bracket 904 and may include various components of the drive system 20 including brakes, a gear reduction, steering components, a wheel hub, a wheel, and other features. The second wheel bracket 904 includes a second bracket face 814 and a second bracket leg 824. The second bracket face 814 is coupled to a pair of second front coupling members 914 (e.g., fasteners, bolts, etc.). The second bracket leg 824 is coupled to a pair of second upper coupling members 924 (e.g., fasteners, bolts, etc.).

The base 702 includes a bottom portion 720 that tapers and curves as the base 702 transitions to the lower leg 706. As shown in FIG. 8, the bottom portion 720 is configured to fit the lower shape and components of the steering assembly 910, including the first wheel assembly 802 and a second wheel assembly 804. The base 702 is coupled to a protrusion, shown as receiver 760, that extends outwardly away from the chassis 12. Specifically, the receiver 760 extends forward of the base 702. The receiver 760 is configured as an interface for a connection to another object (e.g., with a strap or chain). The receiver 760 may facilitate towing (e.g., push, pull) another object and/or may facilitate towing the concrete mixer truck 10. As shown, the receiver 760 defines an aperture (e.g., a vertical aperture) configured to receive another object (e.g., a hook, a strap, etc.). The base 702 defines a first front set of holes 712 or apertures adjacent to the first lateral side 142. The first front set of holes 712 are configured to receive the first front coupling members 912 of the first wheel bracket 902. The base 702 includes a second front set of holes 714 or apertures adjacent to the second lateral side 144. The second front set of holes 714 are configured to receive the second front coupling members 914 of the second wheel bracket 904. The shape of the base 702 is complementary to the shape of the first bracket face 812 and the second bracket face 814 such that the base 702 engages the first bracket face 812 and the second bracket face 814.

The upper leg 704 defines a shaft opening 718 or aperture positioned centrally and configured to receive an actuator shaft 728. The actuator shaft 728 is configured to couple with the first chute actuator 122 to move the main chute 46. The upper leg 704 defines a first upper set of holes 722 or apertures adjacent to the first lateral side 142. The first upper set of holes 722 are configured to receive the first upper coupling members 922 of the first wheel bracket 902. The upper leg 704 defines a second upper set of holes 724 or apertures adjacent to the second lateral side 144. The second upper set of holes 724 are configured to receive the second upper coupling members 924 of the second wheel bracket 904. The shape of the upper leg 704 is complementary to the shape of the first bracket leg 822 second bracket leg 824 such that the upper leg 704 engages the first bracket leg 822 second bracket leg 824.

The lower leg 706 defines a shaft opening 748 or aperture positioned centrally and configured to receive the bottom portion of the actuator shaft 728. The actuator shaft 728 is supported by and able to rotate within the shaft opening 748 and the shaft opening 718 of the upper leg 704. The lower leg 706 defines one or more lower holes 838 or apertures adjacent to the first lateral side 142. The lower holes 838 are each configured to receive a coupling member 828 (e.g., a fastener, a bolt, etc.) that couples the lower leg 706 to a bottom surface of one of the frame rails 40. The shape of the lower leg 706 is complementary to the shape of the frame rails 40 such that the lower leg 706 engages the frame rails 40.

As shown in FIGS. 7-9, the integrated design of the front cross-member 700 facilitates moving the steering assembly 910 rearward along the concrete mixer truck 10 and placed directly above spring hangers, thereby reducing the overhang on the front end 22. Additionally, the relatively close spacing between the front cross-member 700 and the steering assembly 910 components in a small area facilitates having high steering cramp angles with large tires. As shown in FIG. 9, the front cross-member 700 is removable (e.g., by unscrewing the coupling members from the holes) to allow for easy servicing of the steering assembly 910 components and other components of the drive system 20. In some embodiments, the front cross-member 700 may be configured to include a front leaf spring mounting, a chute pivot support mounting, a hydraulic chute control manifold, and a front vehicle recovery provision along with the steering gear mounting.

Ladder Assist

Referring generally to FIGS. 10-15, the concrete mixer truck 10 includes a ladder 1000. The ladder 1000 is coupled to the concrete mixer truck 10 proximate the front end 22 of the chassis 12. In some embodiments, the ladder 1000 is coupled to the concrete mixer truck 10 proximate the rear end 24 of the chassis 12. In still some embodiments, the ladder 1000 is coupled to the concrete mixer truck 10 at an intermediate position, where the intermediate position is defined to be positioned between the front end 22 and the read end 24 of the chassis 12. The ladder 1000 is coupled to an edge of the platform 54 and laterally extends down to the ground. In some embodiments, the ladder 1000 extends both laterally and horizontally about the concrete mixer truck 10. In still some embodiments, the ladder 1000 may be coupled to a slide, where the slide may be coupled to a portion of the platform and extend horizontally about the concrete mixer truck 10. In such an embodiment, the ladder 1000 is selectively repositionable along the length of the slide such to access a plurality of components of the concrete mixer truck 10. The ladder 1000 is configured to assist the operator in laterally moving about the concrete mixer truck 10. By way of example, the operator travels (e.g., steps, climbs, etc.) up the ladder 1000 such to reach the platform 54. Similarly, the operator travels down the ladder 1000 such to reach the ground.

The ladder 1000 is configured to include a plurality of sections, shown as upper ladder portion 1010 and lower ladder portion 1020. The plurality of ladder portions 1010, 1020 are each defined to be half of the ladder 1000 such that the upper ladder portion 1010 and the lower ladder portion 1020 abut one another at the midpoint of the ladder 1000. In some embodiments, the ladder 1000 may include one ladder portion, where the ladder portion is selectively reposition- able between at least a lowered position (e.g., the ladder 1000 is in use) and a stowed position (e.g., the ladder 1000 is stored and not in use). In still some embodiments, the ladder 1000 may include more than two ladder portions, where the operator may selectively reposition the ladder portions independently such to reposition the individual portions between the lowered position and the stowed posi- tion.

The plurality of ladder portions 1010, 1020 couple to one another via one or more latching mechanisms, shown as ladder coupler 1030. The ladder coupler 1030 is further defined to be a hinge. By way of example, the hinge pivots about a 180 degree rotational angle such that the ladder 1000 is substantially straight. In some embodiments, the hinge defines a rotational angle less than 180 degrees such that the ladder 1000 is sloped away from the concrete mixer truck 10. In still some embodiments, the hinge defines a rotational angle greater than 180 degrees such that the ladder is sloped toward the concrete mixer truck 10. The plurality of ladder portions 1010, 1020 include a second ladder coupler 1030, positioned opposite to the ladder coupler 1030. By way of example, the ladder coupler 1030 and the second ladder coupler 1030 are defined to be substantially similar and as such operate in similar ways. In some embodiments, the plurality of ladder portions 1010, 1020 are coupled to one another with a single ladder coupler 1030. When the lower ladder portion 1020 pivots into the lowered position, the lower ladder portion 1020 abuts bumpers, stops, or the like, shown as ladder stops 1035 in dotted lines in FIGS. 14-15, positioned on the inner side of ladder portion 1010, as seen in these views. The ladder stops 1035 are further configured to be rubber stops that are positioned in a plurality of positions along a contact plane of the ladder 1000. In some embodiments, the ladder stops 1035 are manufactured out of alternate materials (e.g., composite, plastic, fiberglass, etc.).

In some embodiments, the ladder coupler 1030 is a sliding mechanism. In such an embodiment, the lower ladder portion 1020 is selectively repositionable between the lowered position and the stowed position by sliding such that the lower ladder portion 1020 overlaps the upper ladder portion. When in the stowed position, the plurality of ladder portions 1010, 1020 include a locking mechanism that holds the lower ladder portion 1020 in the stowed position. The ladder 1000 may be selectively repositionable between the lowered position and the stowed position by sliding the upper ladder portion 1010 such to overlap the lower ladder portion 1020. The sliding mechanism may be stopped along any portion of the ladder 1000 to define a plurality of ladder lengths.

In some embodiments, the ladder coupler 1030 is a combination of both the hinge and the sliding mechanism. In such an embodiment, the ladder 1000 is selectively pivot- able between the stowed position and the lowered position about the upper ladder portion 1010. Once the ladder 1000 is pivoted into the lowered position, the lower ladder portion 1020 is slidably repositionable between the lowered position and the stowed position.

The ladder 1000 further includes a first rail 1040 and a second rail 1050. The first rail 1040 and the second rail 1050 are positioned parallel to one another. In some embodiments, the first rail 1040 and the second rail 1050 are not positioned parallel to one another (e.g., angular, perpendicular, etc.). By way of example, the first rail 1040 and the second rail 1050 each include at least one ladder stop 1035, positioned proximal to the bottom of the lower ladder portion 1020. In some embodiments, the operator uses at least one of the first rail 1040 and the second rail 1050 as handles to prevent the operator from falling. The first rail 1040 includes a first handle 1052, coupled to at least the upper ladder portion 1010. The first handle 1052 is configured to receive a hand of the operator such that the operator holds on while climbing up and down the ladder 1000. The second rail 1050 includes a second handle 1054, coupled to at least the upper ladder portion 1010. The second handle 1054 is configured to receive a hand of the operator such that the operator holds on while climbing up and down the ladder 1000. The first handle 1052 and the second handle 1054 are further defined to be dimensionally similar and positioned along similar contact planes of at least the upper ladder portion 1010. In some embodiments, the first rail 1040 may define a different length than the second rail 1050. In still some embodiments, the ladder 1000 may include additional rails positioned on at least the lower ladder portion 1020.

The ladder 1000 further includes a plurality of steps, shown as ladder steps 1060. The ladder steps 1060 may be positioned equidistant along the length of the ladder 1000. In other embodiments, the ladder steps 1060 are not positioned equidistant one another. The ladder steps 1060 are disposed within and couple the first rail 1040 and the second rail 1050. The ladder steps 1060 are further defined to be parallel to one another between the first rail 1040 and the second rail 1050. By way of example, the operator uses the ladder steps 1060 to move up and down the ladder 1000. In some embodiments, the ladder steps 1060 can be used as handles that the operator holds on to such to prevent the operator from falling. The upper ladder portion 1010 includes a similar number of ladder steps 1060 as the lower ladder portion 1020. In some embodiments, the upper ladder por- tion 1010 and the lower ladder portion 1020 include a different number of ladder steps 1060.

The ladder 1000 further includes an assist system, shown as ladder assist 1070. The ladder 1000 includes a single ladder assist 1070. In some embodiments, the ladder 1000 utilizes multiple ladder assists 1070, responsible for differ- ent ladder components (e.g., secondary ladder 1000 movements). In still some embodiments, the ladder 1000 utilizes multiple ladder assists 1070, positioned adjacent one another and responsible for the same ladder components. The ladder assist 1070 is configured to assist the operator in selectively repositioning the lower ladder portion 1020 into the lowered position. The ladder assist 1070 is further configured to slow the lower ladder portion 1020 when pivoting into the lowered position, such to prevent the lower ladder portion 1020 from slamming into the ladder stops 1035. The ladder assist 1070 is further configured to assist the operator in pivoting the lower ladder portion 1020 in to the stowed position. It may be seen as advantageous for the operators to use the ladder assist 1070 to selectively reposition the ladder 1000 between the lowered position and the stowed position to reduce strain on the operators when repositioning the ladder 1000.

In some embodiments, the ladder assist 1070 is an electronic assist mechanism where the operator interfaces with a controller to selectively reposition at least the lower ladder portion 1020 into the lowered position and the stowed position. The controller may be a joystick, remote, or the like. The controller may be operably coupled to a motor, where the motor is coupled to at least one of the upper ladder portion 1010 and the lower ladder portion 1020. In such an embodiment, the ladder assist 1070 raises or lowers the lower ladder portion 1020 upon receiving a signal from the controller.

In some embodiments, the ladder assist 1070 is a pulley mechanism where the operator interfaces with a cable (e.g., rope, cord, strand, etc.). The cable has at least one end coupled to the bottom of the lower ladder portion 1020 and another end that is coupled to the operator. In some embodiments, both ends of the cable are coupled to the lower ladder portion 1020. By way of example, the operator interfaces with at least one end of the cable to raise and lower the lower ladder portion 1020. In some embodiments, one end of the cable is coupled to a cable drum, where the cable drum winds and unwinds to release or bring in parts of the cable.

Figure 15:
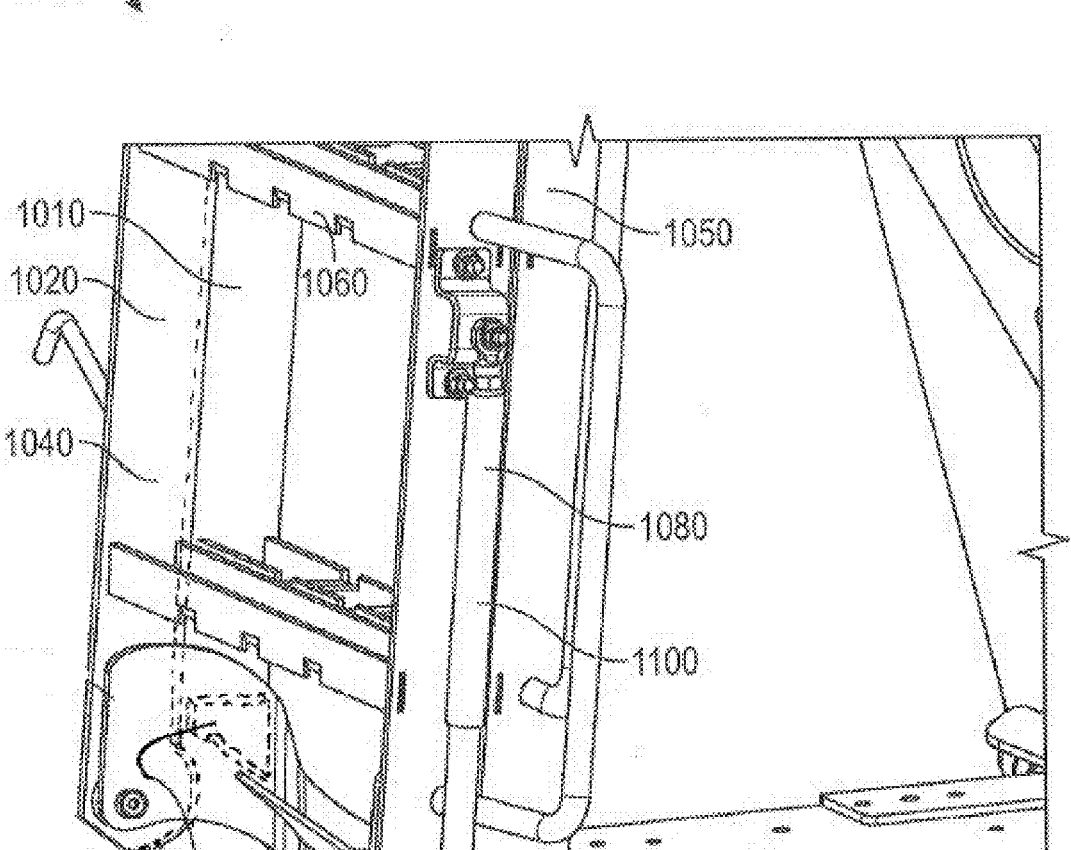
FIG. 15 is a detailed view of the ladder assist of FIG. 10, according to an exemplary embodiment.

Referring now to FIG. 15, the ladder assist 1070 includes a soft close mechanism 1080, fixedly coupled to the lower ladder portion 1020. In some embodiments, the soft close mechanism 1080 may include a damper mechanism disposed within, where the damper mechanism facilitates soft opening and closing of the lower ladder portion 1020. In still some embodiments, the soft close mechanism 1080 may include a spring component, where the spring acts against the lower ladder portion 1020 movement. In still some embodiments, the soft close mechanism 1080 may be a combination of both a damper mechanism and a spring mechanism, where the damper mechanism and spring mechanism can work with one another or against one another to assist the lower ladder portion 1020 between the stowed position and the lowered position. The ladder assist 1070 includes a rigid structure or fixed structure, shown as fixed portion 1090. The fixed portion 1090 is fixedly coupled to both the soft close mechanism 1080 and the ladder 1000. The fixed portion 1090 is fixedly coupled to the soft close mechanism 1080 by a fastener (e.g., bolt, screw, joint, etc.), shown as fastener 1095. By way of example, when the lower ladder portion 1020 pivots into the lowered position, the soft close mechanism pivots about the fastener 1095.

Referring still to FIG. 15, the soft close mechanism 1080 includes a plurality of portions, shown as outer portion 1100 and inner portion 1110. The outer portion 1100 is positioned proximate the lower ladder portion 1020 and the inner portion 1110 is positioned proximate the fixed portion 1090. In some embodiments, the outer portion 1100 is positioned proximate the fixed portion 1090 and the inner portion 1110 is positioned proximate the lower ladder portion 1020. The inner portion 1110 is defined to be dimensionally smaller than the outer portion 1100 such that the inner portion 1110 can be disposed within the outer portion 1100. In some embodiments, the outer portion 1100 and the inner portion 1110 are dimensionally similar. The inner portion 1110 is configured to translate in and out of the outer portion 1100. More specifically, the inner portion 1110 is configured to translate in and out of the outer portion 1100 when the lower ladder portion 1020 is selectively repositionable between the stowed position and the lowered position. When the lower ladder portion 1020 is in at least one of the stowed position and the lowered position, the soft close mechanism 1080 is defined to be in an extended position, where the inner portion 1110 is fully extended from the outer portion 1100. When the lower ladder portion 1020 is in the intermediate position (e.g., between the stowed position and the lowered position), the soft close mechanism 1080 is defined to be in a retracted position, where at least a portion of the inner portion 1110 is disposed within the outer portion 1100. The intermediate position may be a position where the lower ladder portion 1020 is substantially perpendicular to the upper ladder portion 1010.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field pro- grammable gate array (FPGA), or other programmable logic device, discrete gate or transistor logic, discrete hardware components, or any combination thereof designed to per- form the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk stor- age) for storing data and/or computer code for completing or facilitating the various processes, layers and modules described in the present disclosure. The memory may be or include volatile memory or non-volatile memory, and may include database components, object code components, script components, or any other type of information struc- ture for supporting the various activities and information structures described in the present disclosure. According to an exemplary embodiment, the memory is communicably connected to the processor via a processing circuit and includes computer code for executing (e.g., by the process- ing circuit or the processor) the one or more processes described herein.

The present disclosure contemplates methods, systems and program products on any machine-readable media for accomplishing various operations. The embodiments of the present disclosure may be implemented using existing com- puter processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-execut- able instructions or data structures and which can be accessed by a general purpose or special purpose computer or other machine with a processor. Combinations of the above are also included within the scope of machine- readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrange- ment of the vehicle 10 and the systems and components thereof as shown in the various exemplary embodiments is illustrative only. Additionally, any element disclosed in one embodiment may be incorporated or utilized with any other embodiment disclosed herein.

What is claimed is:

1. A concrete mixer vehicle comprising:
 a chassis having a front end and a rear end;
 a cab coupled to the front end of the chassis;
 a mixer drum assembly coupled to the chassis;
 a ladder assembly having an upper ladder portion and a lower ladder portion, wherein the upper ladder portion is fixed in position relative to the chassis, wherein the lower ladder portion is pivotally coupled to the upper ladder portion and selectively repositionable between (a) a stowed position in which the lower ladder portion is disposed along the upper ladder portion and (b) a lowered position in which the lower ladder portion extends away from the upper ladder portion; and
 an assist assembly coupled to the upper ladder portion and the lower ladder portion, wherein
 the assist assembly comprises ladder stops,
 the lower ladder portion abuts the ladder stops when the lower ladder portion is in the lowered position, and
 the assist assembly is configured as a soft opening mecha- nism that resists rotation of the lower ladder portion as it transitions from the stowed position to the lowered position, and that prevents the lower ladder portion from slamming into the ladder stops.

2. The concrete mixer vehicle of claim 1, further com- prising a ladder coupler positioned between the upper ladder portion and the lower ladder portion, and wherein the ladder coupler is configured to couple the upper ladder portion to the lower ladder portion.

3. The concrete mixer vehicle of claim 2, further com- prising a second ladder coupler positioned between the upper ladder portion and the lower ladder portion, the second ladder coupler further positioned adjacent to the ladder coupler.

4. The concrete mixer vehicle of claim 3, wherein the ladder coupler and the second ladder coupler are hinges, wherein the hinges selectively pivot between the lowered position and the stowed position.

5. The concrete mixer vehicle of claim 1, wherein the soft opening mechanism is fixedly coupled to the lower ladder portion, and wherein the soft opening mechanism pivots between an extended position and a retracted position.

6. The concrete mixer vehicle of claim 5, wherein the soft opening mechanism further comprises an outer portion and an inner portion, wherein the inner portion slides in and out of engagement with the outer portion when the lower ladder portion is selectively repositioned between the stowed posi- tion and the lowered position.

7. A ladder assembly for a concrete mixer vehicle comprising:

a first rail extending along the entire length of the ladder assembly;

a second rail extending along the entire length of the ladder assembly, parallel to the first rail;

a plurality of steps positioned between the first rail and the second rail, the plurality of steps configured to support an operator;

an upper ladder portion, positioned proximate a platform of the concrete mixer vehicle;

a lower ladder portion coupled to the upper ladder portion;

a ladder coupler, coupled to both the upper ladder portion and the lower ladder portion; and a ladder assist positioned between the upper ladder portion and the lower ladder portion, wherein the ladder assist is coupled to the lower ladder portion and a fixed structure of the concrete mixer vehicle, wherein the ladder assist comprises ladder stops, and is configured to pivot the lower ladder portion between a lowered position and a stowed position, the ladder assist slows the lower ladder portion when pivoting into the lowered position, the lower ladder portion abuts the ladder stops when the lower ladder portion is in the lowered position, and the ladder assist is configured as a soft opening mechanism that resists rotation of the lower ladder portion as it transitions from the stowed position to the lowered position, and prevents the lower ladder portion from slamming into the ladder stops.

8. The ladder assembly of claim 7, wherein the ladder coupler is positioned between the upper ladder portion and the lower ladder portion.

9. The ladder assembly of claim 8, further comprising a second ladder coupler positioned between the upper ladder portion and the lower ladder portion, adjacent to the ladder coupler.

10. The ladder assembly of claim 9, wherein the ladder coupler is positioned proximate the first rail and the second ladder coupler is positioned proximate the second rail.

11. The ladder assembly of claim 10, wherein the ladder coupler and the second ladder coupler are hinges, wherein the hinges selectively pivot between the lowered position and the stowed position.

12. The ladder assembly of claim 7, wherein the ladder assist further comprises a soft opening mechanism fixedly coupled to the lower ladder portion, wherein the soft opening mechanism pivots between an extended position and a retracted position.

13. The ladder assembly of claim 12, wherein the soft opening mechanism further comprises an outer portion and an inner portion, wherein the inner portion is slidably provided within the outer portion when the lower ladder portion is selectively repositioned between the stowed position and the lowered position.

14. The ladder assembly of claim 7, wherein the upper ladder portion defines the same dimension as the lower ladder portion.

15. A concrete mixer vehicle comprising:

a chassis having a front end and a rear end;

a cab coupled to the front end of the chassis;

a mixer drum assembly coupled to the chassis; and a ladder assembly having an upper ladder portion and a lower ladder portion, the ladder assembly including:

a first rail extending along the entire length of the ladder assembly;

a second rail extending along the entire length of the ladder assembly, parallel to the first rail; and a ladder assist positioned between the upper ladder portion and the lower ladder portion, the ladder assist comprising a soft opening mechanism fixedly coupled to the lower ladder portion, wherein the ladder assist comprises ladder stops, the lower ladder portion abuts the ladder stops when the lower ladder portion is in a lowered position, the soft opening mechanism resists rotation of the lower ladder portion as it transitions from a stowed position to the lowered position, and prevents the lower ladder portion from slamming into the ladder stops, and the soft opening mechanism further comprises an outer portion and an inner portion, wherein the inner portion is slidably provided within the outer portion when the lower ladder portion is selectively repositioned between the stowed position and the lowered position.

16. The concrete mixer vehicle of claim 15, wherein the inner portion is disposed within the outer portion when the lower ladder portion is in the stowed position.

17. The concrete mixer vehicle of claim 15, wherein the ladder assist is configured to pivot the lower ladder portion between the lowered position and the stowed position and wherein the ladder assist slows the lower ladder portion when pivoting into the lowered position.

18. The concrete mixer vehicle of claim 17, further comprising a ladder coupler positioned between the upper ladder portion and the lower ladder portion, and wherein the ladder coupler is configured to couple the upper ladder portion to the lower ladder portion.

19. The concrete mixer vehicle of claim 18, wherein the ladder coupler is a hinge, and wherein the lower ladder portion is pivoted between the lowered position and the stowed position about the hinge.

* * * * *